United States Patent
Ogawa et al.

(10) Patent No.: US 11,706,367 B2
(45) Date of Patent: Jul. 18, 2023

(54) DEVICE FOR READING IMAGES ON BOTH SIDES OF A DOCUMENT IN PARALLEL, RECORDING MEDIUM, AND CONTROLLING METHOD THEREOF

(71) Applicant: SHARP KABUSHIKI KAISHA, Sakai (JP)

(72) Inventors: Kazuma Ogawa, Sakai (JP); Yasutaka Hirayama, Sakai (JP); Akihito Yoshida, Sakai (JP); Shohichi Fukutome, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/718,142

(22) Filed: Apr. 11, 2022

(65) Prior Publication Data

US 2022/0345583 A1    Oct. 27, 2022

(30) Foreign Application Priority Data

Apr. 27, 2021    (JP) ................................ 2021-074715

(51) Int. Cl.
*H04N 1/04*    (2006.01)
*H04N 1/00*    (2006.01)
(Continued)

(52) U.S. Cl.
CPC ....... *H04N 1/0464* (2013.01); *H04N 1/00652* (2013.01); *H04N 1/00708* (2013.01);
(Continued)

(58) Field of Classification Search
CPC ...... G06K 15/16; G06K 15/1868; G06K 7/10; G03G 15/60; G03G 15/602; G03G 15/5025; G03G 15/5062; G03G 15/607; G03G 15/65; G03G 15/6511; G03G 15/6561; G03G 15/6567; G03G 2215/00316; G03G 2215/00324; G03G 2215/0119; G03G 2215/0158; G03G 2221/1657; G03G 15/235; G03G 15/6564;
(Continued)

(56) References Cited

U.S. PATENT DOCUMENTS 6,751,437 B2 *  6/2004  Shimazu .............. G03G 15/234
                                                                399/396
2019/0238703 A1 *  8/2019  Seki ..................... H04N 1/3878
(Continued)

FOREIGN PATENT DOCUMENTS

JP        2011-086988 A    4/2011

*Primary Examiner* — Negussie Worku
(74) *Attorney, Agent, or Firm* — ScienBiziP, P.C.

(57) ABSTRACT

The multifunction peripheral of the present invention includes an ADF document crop function. According to this ADF document crop function, front side image shaping processing for cutting out a front side document image corresponding to the image on the front side of a document, from a front side read image of the document and for correcting the tilt of the front side document image is performed. Then, on the basis of shaping information in the front side image shaping processing, back side image shaping processing for cutting out a back side document image from a back side read image of the document and for correcting the tilt of the back side document image is performed.

14 Claims, 10 Drawing Sheets

(51) Int. Cl.
  *H04N 1/393* (2006.01)
  *H04N 1/387* (2006.01)
  *H04N 1/12* (2006.01)

(52) U.S. Cl.
  CPC ..... *H04N 1/00724* (2013.01); *H04N 1/00822* (2013.01); *H04N 1/12* (2013.01); *H04N 1/3877* (2013.01); *H04N 1/3935* (2013.01); *H04N 2201/0094* (2013.01)

(58) Field of Classification Search
  CPC . G03G 2215/00198; G03G 2215/0021; G03G 2215/00232; G03G 2215/00329; G03G 2215/00333; G03G 2215/00721; G03G 2215/0129; G06T 3/60; G06T 1/00; G06T 3/608; G06T 2207/10008; G06T 2207/30176; G06T 7/11; G06T 3/606; G06T 7/00; B65H 2801/39; B65H 9/006; B65H 2513/10; B65H 7/06; B65H 2301/33312; B65H 2403/481; B65H 5/062; B65H 2511/22; B65H 2301/1321; B65H 2301/35; B65H 2403/40; B65H 2403/724; B65H 2404/1442; B65H 2511/11; B65H 2511/16; B65H 2511/24; B65H 2511/52; B65H 2513/50; B65H 2557/24; B65H 2557/242; B65H 29/125; B65H 29/14; B65H 3/042; B65H 3/045; B65H 3/0669; B65H 3/0684; B65H 5/068; B65H 5/26; B65H 7/08; B65H 7/20; B65H 85/00; B65H 2301/331; B65H 2404/611; B65H 2511/51; B65H 2513/512; B65H 2515/60; B65H 2553/416; B65H 2701/1311; B65H 2701/1313; B65H 2801/06; B65H 5/38; B65H 7/02; B65H 7/14; H04N 1/3878; H04N 2201/0094; H04N 1/00718; H04N 1/3873; H04N 1/387; H04N 1/00708; H04N 1/00748; H04N 1/00774; H04N 2201/0081; H04N 1/12; H04N 1/3876; H04N 1/3877; H04N 1/00005; H04N 1/00734; H04N 1/00745; H04N 1/00588; H04N 1/00721; H04N 1/3935; H04N 1/40062; H04N 1/0044; H04N 1/00681; H04N 1/00689; H04N 1/00694; H04N 1/00702; H04N 1/00795; H04N 1/193; H04N 1/40; H04N 1/00013; H04N 1/0071; H04N 1/00737; H04N 1/00771; H04N 1/00777; H04N 1/00779; H04N 1/047; H04N 1/203; H04N 2201/0091; H04N 1/00037; H04N 1/00082; H04N 1/00602; H04N 1/00705; H04N 1/00785; H04N 1/04; H04N 2201/0049; H04N 1/00331; H04N 1/00697; H04N 1/00782; H04N 1/0283; H04N 1/1061; H04N 1/3872; H04N 2201/0082; H04N 1/00087; H04N 1/00408; H04N 1/00411; H04N 1/00469; H04N 1/00474; H04N 1/00482; H04N 1/00578; H04N 1/0058; H04N 1/00604; H04N 1/00612; H04N 1/00615; H04N 1/0066; H04N 1/00713; H04N 1/00724; H04N 1/00726; H04N 1/00801; H04N 1/00809; H04N 1/00811; H04N 1/00814; H04N 1/00824; H04N 1/00864; H04N 1/2038; H04N 1/2338; H04N 1/2369; H04N 1/32277; H04N 1/38; H04N 1/1409; H04N 1/46; H04N 2201/0471; H04N 2201/04734; H04N 2201/04787; H04N 1/00039; H04N 1/00204; H04N 1/00209; H04N 1/00244; H04N 1/00307; H04N 1/0032; H04N 1/00336; H04N 1/00416; H04N 1/00432; H04N 1/00477; H04N 1/00501; H04N 1/00591; H04N 1/00628; H04N 1/00687; H04N 1/00732; H04N 1/0075; H04N 1/00816; H04N 1/00822; H04N 1/0097; H04N 1/0288; H04N 1/053; H04N 1/10; H04N 1/1017; H04N 1/107; H04N 1/1075; H04N 1/1077; H04N 1/2036; H04N 1/2307; H04N 1/32106; H04N 1/32288; H04N 1/32309; H04N 1/32315; H04N 1/40012; H04N 1/6072; H04N 1/62; H04N 2201/0055; H04N 2201/0084; H04N 2201/0096; H04N 2201/02425; H04N 2201/03162; H04N 2201/0436; H04N 2201/04724; H04N 2201/04789; H04N 2201/04791; H04N 2201/3222; H04N 2201/3283; H04N 2201/3288; H04N 1/00; H04N 1/00007; H04N 1/00015; H04N 1/00023; H04N 1/00042; H04N 1/00047; H04N 1/0005; H04N 1/00063; H04N 1/00076; H04N 1/00092; H04N 1/00278; H04N 1/0035; H04N 1/00421; H04N 1/00424; H04N 1/00456; H04N 1/00472; H04N 1/0057; H04N 1/00572; H04N 1/0062; H04N 1/00631; H04N 1/00652; H04N 1/00692; H04N 1/00758; H04N 1/00766; H04N 1/0079; H04N 1/00793; H04N 1/00803; H04N 1/00806; H04N 1/0464; H04N 1/191; H04N 1/192; H04N 1/2032; H04N 1/32358; H04N 1/3263; H04N 1/32657; H04N 1/32673; H04N 1/40056; H04N 1/40068; H04N 1/401; H04N 1/484; H04N 1/642; H04N 2201/0098; H04N 2201/3242; H04N 2201/3274; H04N 1/00018; H04N 1/00068; H04N 1/00111; H04N 1/00014; H04N 1/00122; H04N 1/00435; H04N 1/00442; H04N 1/00448; H04N 1/00599; H04N 1/00657; H04N 1/00716; H04N 1/00753; H04N 1/00755; H04N 1/00798; H04N 1/00867; H04N 1/00875; H04N 1/0289; H04N 1/0405; H04N 1/121; H04N 1/125; H04N 1/128; H04N 1/1911; H04N 1/233; H04N 1/32464; H04N 1/393; H04N 1/4078; H04N 1/4095; H04N 1/141; H04N 1/448; H04N 1/60; H04N 1/6027; H04N 1/6075; H04N 1/64; H04N 2201/0416; H04N 2201/0422; H04N 2201/0426; H04N 2201/0434; H04N 2201/04703; H04N 2201/04717; H04N 2201/04729; H04N 2201/04731; H04N 2201/04732; H04N 2201/04737; H04N 2201/04756; H04N 2201/04793; H04N 2201/04796
  USPC ..................................................... 358/444
  See application file for complete search history.

(56) References Cited

U.S. PATENT DOCUMENTS

2019/0327385 A1* 10/2019 Nakano .............. H04N 1/00718
2020/0296255 A1* 9/2020 Hashimoto .......... H04N 1/4097

(56) References Cited

U.S. PATENT DOCUMENTS

| | | | | |
|---|---|---|---|---|
| 2021/0044713 | A1* | 2/2021 | Nakashima | H04N 1/00604 |
| 2022/0060590 | A1* | 2/2022 | Hiro | H04N 1/00716 |
| 2022/0070322 | A1* | 3/2022 | Ogawa | H04N 1/3878 |
| 2022/0201155 | A1* | 6/2022 | Nakajima | H04N 1/00737 |
| 2022/0345583 | A1* | 10/2022 | Ogawa | H04N 1/3935 |
| 2023/0069064 | A1* | 3/2023 | Ogawa | G06T 7/11 |

* cited by examiner

[FRONT SIDE READ IMAGE]     [BACK SIDE READ IMAGE]

DEVICE FOR READING IMAGES ON BOTH SIDES OF A DOCUMENT IN PARALLEL, RECORDING MEDIUM, AND CONTROLLING METHOD THEREOF

BACKGROUND OF THE INVENTION

Field of the Invention

The present invention relates to a document reading device, an image output apparatus equipped with the document reading device, a recording medium storing a control program for the document reading device, and a control method for the document reading device. In particular, the present invention relates to a document reading device that reads images on both sides of a sheet-like document in parallel while conveying the document along a conveyance path, an image output apparatus equipped with the document reading device, a recording medium storing a control program for the document reading device, and a control method for the document reading device.

Description of the Background Art

An example of this type of technique is disclosed in Japanese Unexamined Patent Application Publication No. 2011-86988. According to the technique disclosed in this Japanese Unexamined Patent Application Publication No. 2011-86988, a sheet-like document is conveyed by an automatic document feeder (hereinafter referred to as "ADF"), and more specifically, is conveyed along a conveyance path in the ADF. Further, at a first reading position in the conveyance path, the image on one side of the document passing through the first reading position is read by a first reader. Additionally, at a second reading position different from the first reading position in the conveyance path, the image on the other side of the document passing through the second reading position is read by a second reader. In the same way, images on both sides of a small document such as a business card can be read in parallel, so to speak, at the same time.

In such a configuration where images on both sides of a document are read simultaneously using a so-called skimming through method, the document may be conveyed in a tilted state. To deal with this, for example, a mechanical mechanism can be used to correct the document tilt itself. However, this method requires not only a mechanical mechanism to correct the document tilt itself, but also ancillary elements such as a sensor to detect the orientation of the document, which makes the configuration more complex. In this regard, it is possible to correct the tilt of the document image on the read image, that is, by image processing. However, this method requires correcting the tilt for both sides of the document, that is, for each of the two images, which makes the processing more complicated.

Therefore, it is an object of the present invention to provide a new technique that can deal with a document conveyed in a tilted state with a simple configuration and simple processing.

SUMMARY OF THE INVENTION

In order to achieve the above object, the present invention includes a first aspect relating to a document reading device, a second aspect relating to an image output apparatus equipped with the document reading device, a third aspect relating to a recording medium storing a control program for the document reading device, and a fourth aspect relating to a control method for the document reading device.

The first aspect relating to a document reading device in these includes a conveyer, a first reader, a second reader, a first shaper, and a second shaper. The conveyer conveys a sheet-like document along a conveyance path. The first reader reads, at a first reading position in the conveyance path, an image on one side of the document passing through the first reading position, over a first reading area larger than a size of the document, in other words, reads the first reading area as a reading target area. The second reader reads, at a second reading position in the conveyance path, an image on an other side of the document passing through the second reading position, over a second reading area conjugate to the first reading area, that is, reads the second reading area which is larger than the size of the document as a reading target area. The first shaper performs first shaping processing. In this first shaping processing, the first shaper cuts out a first image corresponding to the image on the one side of the document from a first read image read by the first reader. Additionally, when the first image is tilted to or more than a predetermined degree, the first shaper corrects a tilt of the first image. Further, the second shaper performs second shaping processing. In this second shaping processing, the second shaper cuts out a second image corresponding to the image on the other side of the document from a second read image read by the second reader. Additionally, when the second image is tilted to or more than the predetermined degree, the second shaper corrects a tilt of the second image. Here, the second shaper performs the second shaping processing on the basis of shaping information relating to the first shaping processing, so to speak, with the use of the shaping information.

The conveyer conveys the document at a set speed set as a conveyance speed of the document when the size of the document is or larger than a predetermined size. Further, the conveyer conveys the document at a lowest speed that can be set as the conveyance speed when the size of the document is smaller than the predetermined size.

When the document is conveyed at a conveyance speed that depends on the size of the document, the reading resolution of each of the first reader and the second reader may be set in accordance with the conveyance speed of the document.

In the first aspect of the present invention, a first converter may be further provided. This first converter converts an image resolution of each of the first image and the second image to an image resolution corresponding to the set speed when the document is conveyed at the lowest speed different from the set speed. Here, the case where the document is conveyed at the lowest speed different from the set speed includes the case where the size of the document is smaller than the predetermined size and the set speed set as the conveyance speed of the document is not the lowest speed.

The predetermined size referred to here, that is, the size that serves as the boundary of whether the document is conveyed at either the set speed or the lowest speed, may be changed optionally.

In the first aspect of the present invention, a document size detector may be further provided. This document size detector detects the size of the document before the document is conveyed by the conveyer. In this case, the size of the document is recognized on the basis of a detection result by the document size detector.

Furthermore, in the first aspect of the present invention, a data originator may be further provided. This data originator performs data origination processing in which a character image contained in at least one of the first image and the second image is converted into character data when the document is a business card.

In addition to being provided with such data originator, a second converter may be further provided. When an image resolution of a processing target image, among the first image and the second image, to be processed in the data origination processing is higher than a predetermined resolution, this second converter converts the image resolution of the processing target image to the predetermined resolution, and then subjects the processing target image to the data origination processing.

Whether the document is a business card may be determined on the basis of the size of the document.

In addition, whether the document is a business card may be determined on the basis of a size of at least one of the first image and the second image.

Further, a determination criterion as to whether the document is a business card may be optionally changeable.

In the first aspect of the present invention, a data origination controller may be further provided. This data origination controller enables or disables the data originator in accordance with a user operation.

An image outputter according to the second aspect of the present invention includes the document reading device according to the first aspect and an image outputter. The image outputter outputs the first image after the first shaping processing by the first shaper and the second image after the second shaping processing by the second shaper.

A recording medium according to the third aspect of the present invention stores a control program for the document reading device, and the control program causes the computer of the document reading device to execute a first reading procedure, a second reading procedure, a first shaping procedure, and a second shaping procedure. Here, the document reading device includes a conveyer, a first reader, and a second reader. The conveyer conveys a sheet-like document along a conveyance path. The first reader reads, at a first reading position in the conveyance path, an image on one side of the document passing through the first reading position. Further, the second reader reads, at a second reading position in the conveyance path, an image on the other side of the document passing through the second reading position. Then, in the first reading procedure, the first reader reads an image on one side of the document, over a first reading area larger than a size of the document, in other words, reads the first reading area as a reading target area. In the second reading procedure, the second reader reads an image on an other side of the document, over a second reading area conjugate to the first reading area, that is, reads the second reading area which is larger than the size of the document as a reading target area. The first shaping procedure performs first shaping processing. In this first shaping processing, a first image corresponding to the image on the one side of the document is cut out from a first read image read by the first reading procedure. Additionally, in the first shaping processing, when the first image is tilted to or more than a predetermined degree, the tilt of the first image is corrected. Further, the second shaping procedure performs second shaping processing. In this second shaping processing, a second image corresponding to the image on the other side of the document is cut out from a second read image read by the second reading procedure. Additionally, in the second shaping procedure, when the second image is tilted to or more than a predetermined degree, the tilt of the second image is corrected. This second shaping processing is performed on the basis of shaping information relating to the first shaping processing, so to speak, with the use of the shaping information.

A control method for a document reading device according to the fourth aspect of the present invention includes first reading, second reading, first shaping, and second shaping. Here, the document reading device includes a conveyer, a first reader, and a second reader. The conveyer conveys a sheet-like document along a conveyance path. The first reader reads, at a first reading position in the conveyance path, an image on one side of the document passing through the first reading position. Further, the second reader reads, at a second reading position in the conveyance path, an image on the other side of the document passing through the second reading position. Then, in the first reading, the first reader reads an image on one side of the document passing, over a first reading area larger than a size of the document, in other words, reads the first reading area as a reading target area. In the second reading, the second reader reads an image on an other side of the document, over a second reading area conjugate to the first reading area, that is, reads the second reading area which is larger than the size of the document as a reading target area. The first shaping performs first shaping processing. In this first shaping processing, a first image corresponding to the image on the one side of the document is cut out from a first read image read by the first reading. Additionally, in the first shaping processing, when the first image is tilted to or more than a predetermined degree, the tilt of the first image is corrected. Further, the second shaping performs second shaping processing. In this second shaping processing, a second image corresponding to the image on the other side of the document is cut out from a second read image read by the second reading. Additionally, in the second shaping processing, when the second image is tilted to or more than the predetermined degree, the tilt of the second image is corrected. This second shaping processing is performed on the basis of shaping information relating to the first shaping processing, so to speak, with the use of the shaping information.

According to the present invention, a document reading device that simultaneously reads images on both sides of a sheet-like document using a skimming through method can deal with a document conveyed in a tilted state with a simple configuration and simple processing.

DESCRIPTION OF THE PREFERRED EMBODIMENTS

Example

Figure 1:
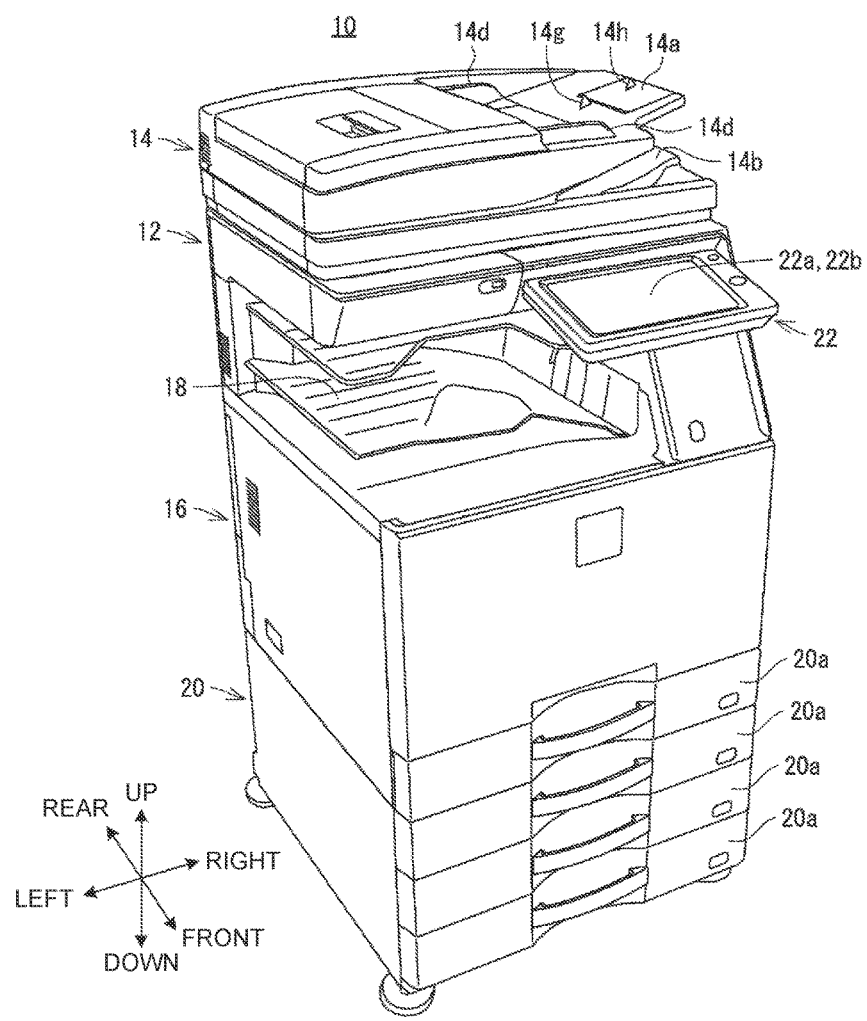
FIG. 1 is a perspective view of a multifunction peripheral according to an example of the present invention.

An example of the present invention will be described using a multifunction peripheral (MFP) 10 illustrated in FIG. 1 as an example.

The multifunction peripheral 10 according to the present example is a type of image forming apparatus and has a plurality of functions such as a copy function, an image scanner function, a printer function, and a fax function. FIG. 1 is a perspective view of the multifunction peripheral 10, illustrating a front surface, an upper surface, and a left side surface of the multifunction peripheral 10 installed in a ready-for-use condition. In other words, the up-down direction in FIG. 1 corresponds to the up-down direction of the multifunction peripheral 10. Further, the right diagonal downward direction in FIG. 1 corresponds to the front of the multifunction peripheral 10, and the left diagonal upward direction in FIG. 1 corresponds to the rear of the multifunction peripheral 10. In addition, the left diagonal downward direction in FIG. 1 corresponds to the left side of the multifunction peripheral 10, and the right diagonal upward direction in FIG. 1 corresponds to the right side of the multifunction peripheral 10.

An image reader 12 as an example of an image reader is provided at the upper part of the multifunction peripheral 10. The image reader 12 is responsible for image reading processing described below, that reads an image of a document 100, strictly speaking, an image on one side of the document 100, and outputs two-dimensional read image data corresponding to the read image. Therefore, although not illustrated in FIG. 1, the image reader 12 includes a document table 12a on which the document 100 is placed, and an image reading unit 12b for reading an image on one side of the document 100 placed on the document table 12a (see FIG. 3).

Above the image reader 12, or in other words, above the document table 12a, an ADF 14 which also serves as a document pressing cover for pressing the document 100 placed on the document table 12a is provided. The ADF 14 is provided in a manner to transition between a state where the upper surface of the document table 12a is exposed to the outside and a state where the upper surface of the document table 12a is covered. Therefore, the ADF 14 is coupled to the main body (housing) of the multifunction peripheral 10 via a suitable movable support member such as a hinge (not illustrated). In FIG. 1, the ADF 14 covers the upper surface of the document table 12a.

The ADF 14, which will be described in detail below, includes a document placement tray 14a as a document placement section. On this document placement tray 14a, the document 100, strictly speaking, the sheet-like document 100, can be placed, and in particular, a plurality of documents 100 can be placed in a stacked manner. Further, the ADF 14 automatically feeds the document 100 placed on the document placement tray 14a to the image reader 12 one sheet at a time (sheet by sheet) so as to subject the document 100 to the image reading processing performed by the image reader 12. The document 100 after the image reading processing by the image reader 12 is discharged onto a document discharge tray 14b of the ADF 14. The ADF 14 exerts its original function as the ADF 14 (not as the document pressing cover) in a state where the ADF 14 covers the upper surface of the document table 12a, as illustrated in FIG. 1, and any object (other than the ADF 14 per se) is not put on the document table 12a. In addition, the ADF 14 has a built-in back side reading unit 14c for reading the image on the other side of the document 100, that is, the back side image of the document 100.

Furthermore, an image former 16 as an example of an image former is provided below the image reader 12. The image former 16 is responsible for image forming processing for forming, namely, printing an image based on appropriate image data, which have been subjected to image processing by an image processor 24 described below, on a paper as a sheet-like image recording medium (not illustrated). This image forming processing is executed by, for example, a known electrophotographic method (Carlson process method). Therefore, the image former 16 includes a photoreceptor drum, a charging device, an exposure device, a developing device, a transferring device, a fixing device, a cleaning device, a static elimination device, and the like, which are not illustrated. The paper having been subjected to the image forming processing executed by the image former 16, that is, a printed matter is discharged onto a paper discharge tray 18. The paper discharge tray 18 is provided between the image former 16 and the image reader 12, and is provided in the so-called intra-body space of the multifunction peripheral 10. Alternatively, the paper discharge tray 18 may be provided in the extra-body space outside of the multifunction peripheral 10. In addition, the image former 16 is not limited to executing the image forming processing by the electrophotographic method, and may execute the image forming processing by, for example, an inkjet method.

Further, a paper feeder 20 as an example of a paper feeder is provided below the image former 16, in other words, at the lower part of the multifunction peripheral 10. The paper feeder 20 includes one or more, for example, four paper feed cassettes 20a. In each paper feed cassette 20a, appropriately sized sheets of paper are contained. For instance, sheets of paper differently sized from one another are contained in the paper feed cassettes 20a, respectively. In addition, a manual feed tray (not illustrated), which is an auxiliary paper feed tray, is provided at an appropriate position of the multifunction peripheral 10, for example, on the right side surface of the multifunction peripheral 10. The paper feeder 20 uses one of the respective paper feed cassettes 20a and the manual feed tray as a paper feed source, and supplies a paper from the paper feed source to the image former 16 in units of one sheet.

Moreover, an operation unit 22 in the shape of a substantially rectangular plate is provided at the front part of the main body of the multifunction peripheral 10, in the upper part of the multifunction peripheral 10. This operation unit 22 is provided so as to be rotatable about one side edge, while the one side edge is coupled to the main body of the multifunction peripheral 10. One main surface of the operation unit 22 (the main surface facing upward in FIG. 1) is an operation surface, and a display 22b with a touch panel 22a is provided on this operation surface.

The display 22b with the touch panel 22a is a component in which a display 22b having a rectangular-shaped display surface and a sheet-shaped touch panel 22a provided to overlap on the display surface of the display 22b are integrally assembled. The touch panel 22a is an example of an operation acceptor (not illustrated) capable of accepting a touch operation by a user using the multifunction peripheral 10, and is, for example, a projection capacitive panel. Further, the display 22b is an example of a displayer, for example, a liquid crystal display (LCD). The touch panel 22a is not limited to a projection capacitive panel, but may be another type of panel such as a capacitive type of a surface type, an electromagnetic induction type, a resistance film type, and an infrared type. In addition, the display 22b is not limited to a liquid crystal display, and may be an organic electroluminescence (EL) display.

The user usually stands in front of the multifunction peripheral 10 to use the multifunction peripheral 10 and to operate, among other things, the operation unit 22. To ensure good operability and visibility of the operation surface of the operation unit 22 by the user in such a case, the operation unit 22 is provided so as to be rotatable about the coupling portion with the image reader 12 as described above, that is, the operation unit 22 is provided in such a manner that the angle of the operation surface to the user can be adjusted. In addition, the operation unit 22 includes an appropriate hardware switch such as a push button switch in addition to the touch panel 22a. Additionally, the operation unit 22 includes, in addition to the display 22b, an appropriate light-emitter such as a light emitting diode (LED).

Figure 2:
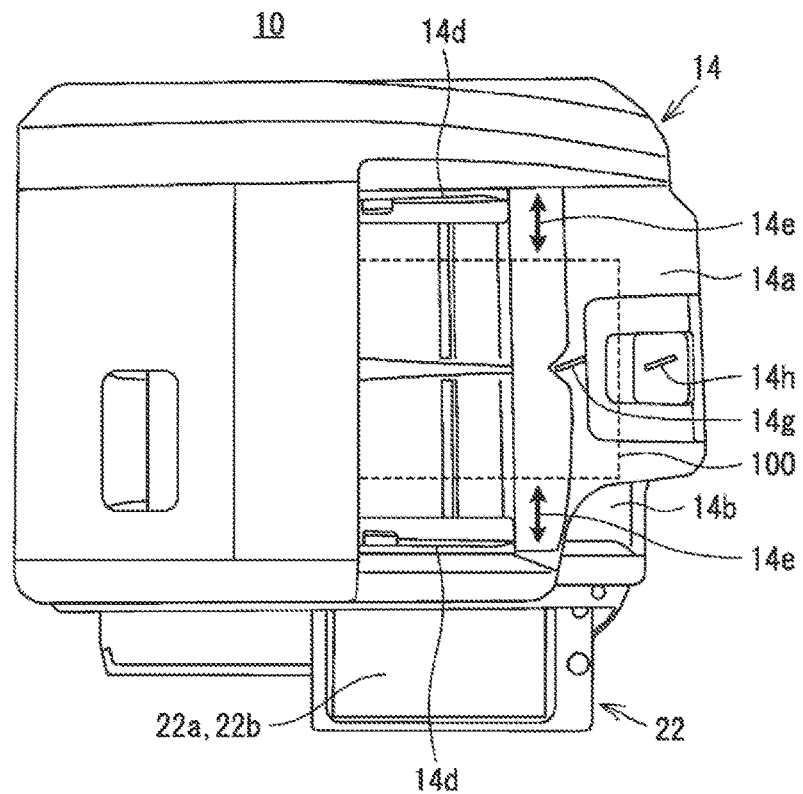
FIG. 2 is a view from above of a state where a document is placed on a document placement tray of an ADF in the same example.

Here, paying attention to the ADF 14 with reference to FIG. 2 as well, the ADF 14 includes a pair of document guides 14d and 14d as an example of a document position regulator. The pair of document guides 14d and 14d regulate positions of both lateral edges of the document 100 in a width direction of the document 100 placed on the document placement tray 14a, strictly speaking, in a direction perpendicular to the conveyance direction of the document 100 by the ADF 14 (the front-rear direction of the multifunction peripheral 10), that is, a conveyance width direction. Specifically, the document guides 14d and 14d can be manually moved (slid) along the conveyance width direction as indicated by two arrows 14e in FIG. 2, and mechanically regulate the position of the both side edges of the document 100 by contacting the both side edges of the document 100. In FIG. 2, the document 100 is illustrated in dashed lines for convenience of explanation. In addition, the document guides 14d and 14d move symmetrically in conjunction with each other, that is, when one is moved, the other moves symmetrically in conjunction with it.

Additionally, although not illustrated in FIGS. 1 and 2, the ADF 14 includes a guide width detector 14f described below (see FIG. 4) as an example of a regulated position detector. This guide width detector 14f detects the regulated position by the document guides 14d and 14d and thus detects a guide width which is the mutual distance between the document guides 14d and 14d. Consequently, for example, the guide width mostly corresponds to the width dimension of the document 100 as a dimension in the conveyance width direction of the document 100 if the positions of both lateral edges in the conveyance width direction of the document 100 have been regulated by the document guides 14d and 14d. Although the detailed description including illustrations is omitted, the guide width detector 14f includes a variable resistor that is provided to indicate a resistance value according to the position of one or both of the document guides 14d and 14d, and detects the guide width on the basis of the resistance value of this variable resistor. Alternatively, the guide width detector 14f may be configured to detect the position of one or both of the document guides 14d and 14d by an appropriate sensor such as an optical sensor, and thus to detect the guide width.

Furthermore, the ADF 14 includes a plurality of, for example, two flat projecting document detection pieces 14g and 14h. These two document detection pieces 14g and 14h are arranged at the substantially center of the document placement tray 14a in the conveyance width direction, and at different appropriate positions from each other in the conveyance direction of the document placement tray 14a. Further, each of the document detection pieces 14g and 14h is in a state of protruding upwardly from the upper surface (document placement surface) of the document placement tray 14a when no external force is applied to the each piece, especially when no external force is applied from above. On the other hand, each of the document detection pieces 14g and 14h is configured to be pushed into the document placement tray 14a by the weight of the document 100 when an external force is applied to the each piece, for example when the each piece is covered by the document 100.

Moreover, although not illustrated in FIGS. 1 and 2, the ADF 14 includes two document length sensors 14i and 14j described below (see FIG. 3) for detecting the state of each of the document detection pieces 14g and 14h, respectively. These two document length sensors 14i and 14j are provided in the document placement tray 14a. Further, one document length sensor 14i detects the state of one document detection piece 14g, and the other document length sensor 14j detects the state of the other document detection piece 14h. Each such document length sensor 14i and 14j is, for example, an optical sensor, and in particular is a transmissive optical sensor. Moreover, each of the document length sensors 14i and 14j cooperates with each of the document detection pieces 14g and 14h to constitute a document length detector 14k described below (see FIG. 14).

Figure 3:
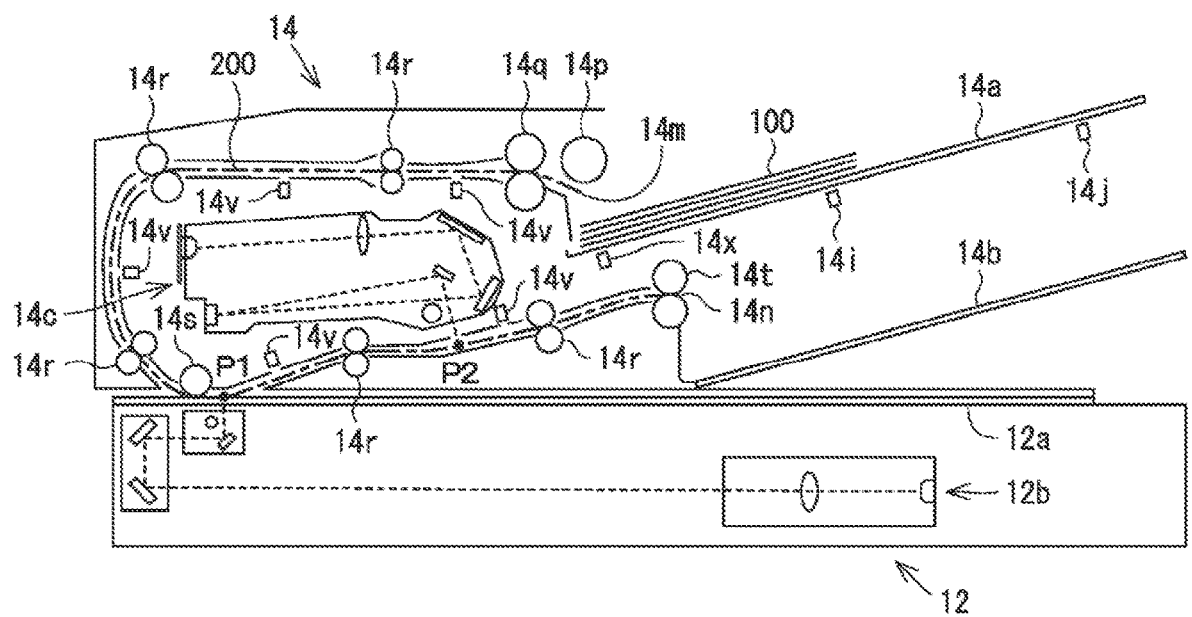
FIG. 3 is a diagram schematically illustrating an internal configuration of an image reader and the ADF in the same example.

Referring to FIG. 3, the inside of the image reader 12 and the ADF 14 will be focused. FIG. 3 is a diagram of the inside of the image reader 12 and the ADF 14 from the front of the multifunction peripheral 10, and is a so-called schematic diagram of the internal configuration.

As illustrated in FIG. 3, the image reader 12 has the document table 12a. The document table 12a is formed by a transparent member such as substantially rectangular flat glass, and is provided in such a manner that its both main surfaces are arranged along the horizontal direction. Further, below the document table 12a, an image reading unit 12b is provided. Although the detailed description is omitted, the image reading unit 12b includes a light source, a mirror, a lens, a line sensor, and the like, and forms a linear first reading position P1 that extends along the front-rear direction of the multifunction peripheral 10 on the upper surface of the document table 12a. Furthermore, below the document table 12a, a drive mechanism (not illustrated) for moving (scanning) the first reading position P1 of the image reading unit 12b along the right-left direction of the multifunction peripheral 10.

In other words, in a state where the document 100 is placed on the document table 12a, the first reading position P1 of the image reading unit 12b is moved by the drive mechanism, and the image on one side of the document 100 is thereby read, more specifically, the image on the front side that is the surface of the document 100 on the side opposite to the document table 12a is read. In short, the image on one side of the document 100 is read while the document 100 is fixed, in the so-called fixed reading method. The direction in which the first reading position P1 of the image reading unit 12b extends, i.e., the front-rear direction of the multifunction peripheral 10, is called a main scanning direction. Further, the direction in which the first reading position P1 of the image reading unit 12b is moved by the drive mechanism, i.e., the right-left direction of the multifunction peripheral 10, is called a sub-scanning direction.

Further, the ADF 14 includes a document conveyance path 200 reaching from a paper feed slot 14m on the document placement tray 14a side to a paper discharge slot 14n on the document discharge tray 14b side. As illustrated in FIG. 3, the document conveyance path 200 is approximately U-shaped (or approximately C-shaped) when viewed from the front of the multifunction peripheral 10.

In the vicinity of the paper feed slot 14m of the document conveyance path 200, a pickup roller 14p for picking up the document 100 placed on the document placement tray 14a from the document placement tray 14a in units of one sheet is provided. The document 100 picked up from the document placement tray 14a by the pickup roller 14p is taken into the document conveyance path 200 through the paper feed slot 14m. For this purpose, a paper feed roller 14q (strictly speaking, a paper feed roller pair) is provided at an end of the document conveyance path 200 on the paper feed slot 14m side, that is, at the upstream end.

In the document conveyance path 200, a plurality of conveyance rollers (strictly speaking, conveyance roller pairs) 14r are provided as appropriate. These conveyance roller pairs 14r convey the document 100 taken into the document conveyance path 200 along (so as to follow) the document conveyance path 200. In addition, each of the conveyance rollers 14r are spaced at appropriate intervals to allow the conveyance of a small-sized document 100 such as a business card. Furthermore, the document conveyance path 200 has a portion in contact with the upper surface of the document table 12a, and the first reading position P1 of the image reading unit 12b can be fixed to that portion and standby.

In other words, in a state where the first reading position P1 of the image reading unit 12b is fixed, when the document 100 is conveyed along the document conveyance path 200, the document 100 passes through the first reading position P1 midway through the conveyance. As a result, the image on the front side of the document 100 is read in a so-called skimming through method. A resist roller 14s for adjusting the timing to feed the document 100 to the first reading position P1 is provided immediately before the first reading position P1 (closest position on the upstream side) in the conveyance direction of the document 100. In addition, the document 100 to be placed on the document placement tray 14a is paced on the document placement tray 14a with the front side facing upward.

Furthermore, the ADF 14 has a built-in back side reading unit 14c for reading the image on the back side of the document 100. Although the detailed description is omitted, similarly to the image reading unit 12b, the back side reading unit 14c also includes a light source, mirror, lens, line sensor, and the like. Further, the back side reading unit 14c forms a second reading position P2 in the document conveyance path 200, more specifically, forms the second reading position P2 downstream from the first reading position P1 in the document 100 conveyance direction. This second reading position P2 also extends in a straight line along the front-rear direction of the multifunction peripheral 10, that is, along the main scanning direction, similarly to the first reading position P1.

In other words, the document 100 which is conveyed along the document conveyance path 200 passes through the first reading position P1 midway through the conveyance as described above, and then passes through the second reading position P2. Here, when the back side reading unit 14c is enabled, more specifically, when a duplex reading function which will be described in detail below is enabled, the image on the back side of the document 100 is read by the back side reading unit 14c, that is, the image is read by the skimming through method.

The document 100 that has passed through this second image reading position P2 is discharged onto the document discharge tray 14b through the paper discharge slot 14n which is the downstream end of the document conveyance path 200. For this purpose, a paper discharge roller (strictly speaking, a paper discharge roller pair) 14t is provided in the paper discharge slot 14n. Each of the pickup roller 14p, the paper feed roller 14q, each of the conveyance rollers 14r, and the resist roller 14s including this paper discharge roller 14t, is driven by a roller driver 14u described below (see FIG. 4).

Moreover, on the document conveyance path 200, a plurality of document conveyance sensors 14v are appropriately provided. These document conveyance sensors 14v detect the document 100 on the document conveyance path 200, in other words, the position (conveyance position) of the document 100 on the document conveyance path 200. The document conveyance sensors 14v are each an optical sensor, specifically a reflective optical sensor, for instance. In addition, the document conveyance sensors 14v are each a component of a conveyance detector 14w described below (see FIG. 4).

In addition, at an appropriate position in the document placement tray 14a, for example, at a position in the document placement tray 14a that is close to the paper feed slot 14m, a document placement sensor 14x is provided. The document placement sensor 14x is an example of a document placement detector for detecting whether the document 100 is placed on the document placement tray 14a. This document placement sensor 14x is also a reflective optical sensor, for example. Additionally, at appropriate positions in the document placement tray 14a, the aforementioned document length sensors 14i and 14j are provided, respectively. In other words, the document length sensor 14i is provided correspondingly to the document detection piece 14g that is not illustrated in FIG. 3 (see FIGS. 1 and 2), and detects the state of the document detection piece 14g. Further, the document length sensor 14j is provided correspondingly to the document detection piece 14h that is not illustrated in FIG. 3 (see FIGS. 1 and 2) and detects the state of the document detection piece 14h. In FIG. 3, for ease of viewing, the document placement sensor 14x and each of the document length sensors 14i and 14j are illustrated to be disposed below the document placement tray 14a, that is, outside of the document placement tray 14a, not inside of it.

Figure 4:
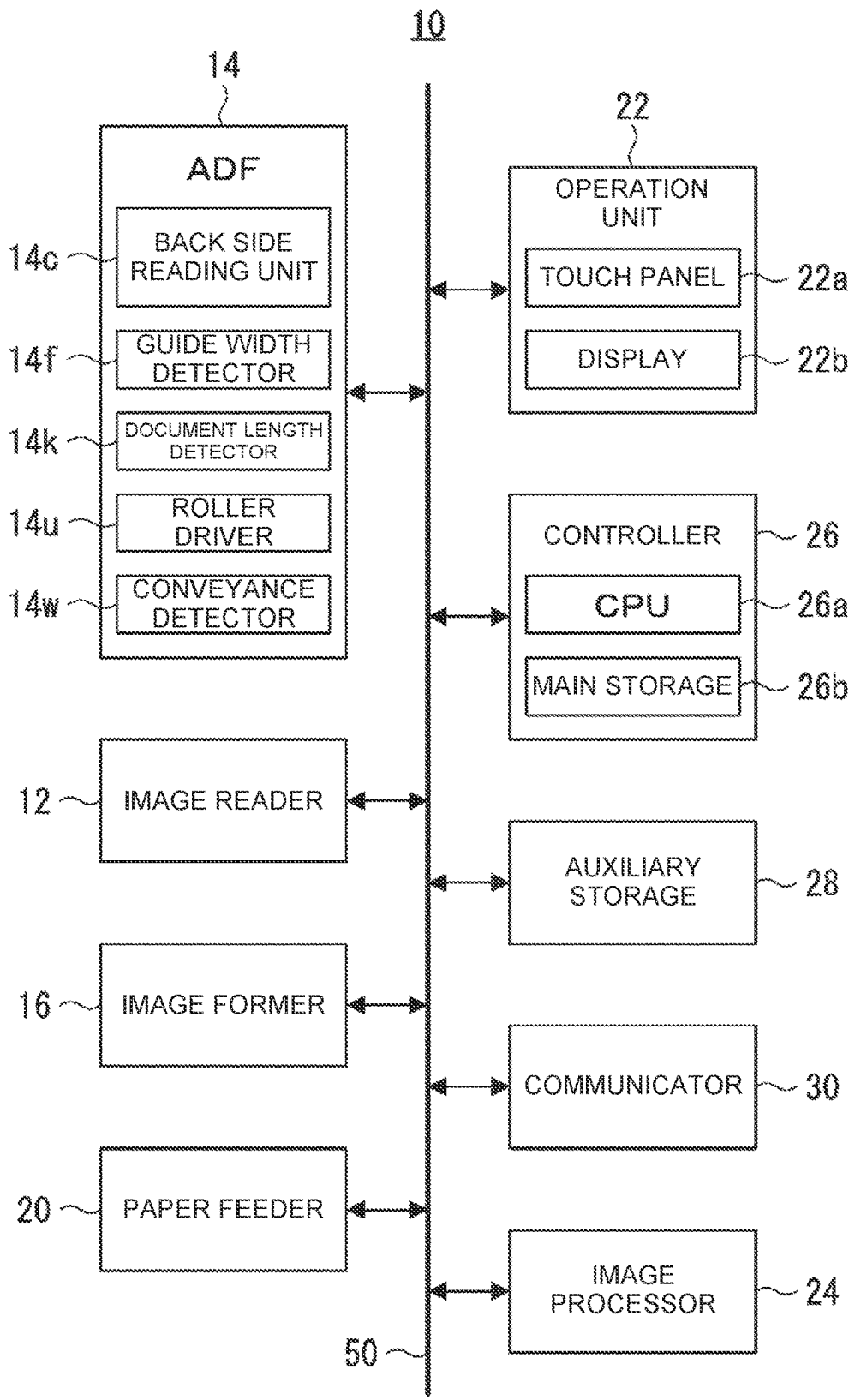
FIG. 4 is a block diagram illustrating an electrical configuration of the multifunction peripheral according to the same example.

FIG. 4 is a block diagram illustrating an electrical configuration of the multifunction peripheral 10. As illustrated in FIG. 4, the multifunction peripheral 10 includes an image processor 24, a controller 26, an auxiliary storage 28, and a communicator 30, in addition to the image reader 12, the ADF 14, the image former 16, the paper feeder 20, and the operation unit 22. These are connected via a bus 50 that is common to each of the above components. The image reader 12, ADF 14, image former 16, paper feeder 20 and operation unit 22 are as described above.

The image processor 24 performs appropriate image processing on various image data. The image data subjected to image processing by the image processor 24 includes the read image data generated by the image reader 12, that is, the read image data of the front side of the document 100. In addition, the read image data generated by the back side reading unit 14c, that is, the read image data of the back side of the document 100, is also included in the image data subjected to image processing by the image processor 24. In particular, the image processor 24 performs front side image shaping processing described below on the read image data of the front side of the document 100. Additionally, the image processor 24 performs back side image shaping processing described below on the read image data of the back side of the document 100. The image data after image processing by the image processor 24 is output as appropriate from the image processor 24 and provided to the image former 16, for example, or stored (saved) in the auxiliary storage 28, or output (transmitted) to the outside via the communicator 30.

The controller 26 is an example of a controller that performs overall control of the multifunction peripheral 10. Therefore, the controller 26 includes a computer as a control executor, for example, a CPU 26a. Additionally, the controller 26 includes a main storage 26b as a main memory storage directly accessible by the CPU 26a. The main storage 26b includes a ROM and a RAM (which are not illustrated). The ROM stores a control program for controlling an operation of the CPU 26a, i.e., firmware. Further, the RAM constitutes a work area and a buffer area when the CPU 26a executes processing based on the control program.

The auxiliary storage 28 is an example of an auxiliary storage. In other words, various data such as the image data after the image processing by the aforementioned image processor 24 is appropriately stored in the auxiliary storage 28. This auxiliary storage 28 includes, for example, a hard disk drive (not illustrated). Additionally, the auxiliary storage 28 may include a rewritable non-volatile memory such as a flash memory.

The communicator 30 is an example of a communicator. That is, the communicator 30 is connected to a communication network (not illustrated) and thereby is responsible for bidirectional communication via the communication network. The communication network referred to here includes a LAN, the Internet, a public switched telephone network, or the like. In addition, the LAN includes a wireless LAN, and in particular, Wi-Fi (registered trademark).

Further, paying attention to the ADF 14 in FIG. 4, the ADF 14 includes the back side reading unit 14c, the guide width detector 14f, a document length detector 14k, a roller driver 14u, and a conveyance detector 14w. The back side reading unit 14c is as described above. In addition, the guide width detector 14f detects the regulated position by the document guides 14d and 14d and thus detects a guide width which is the mutual distance between the document guides 14d and 14d. The document length detector 14k includes respective document detection pieces 14g and 14h and respective document length sensors 14i and 14j. This document length detector 14k detects a document length dimension which is the dimension of the document 100 in the conveyance direction, on the basis of the output signal of each of the document length sensors 14i and 14j, that is, on the basis of the state of each of the document detection pieces 14g and 14h.

The guide width detector 14f and the document length detector 14k cooperate with the CPU 26a to implement a document size detection function for detecting the size of the document 100. In other words, the CPU 26a detects (derives) the size of the document 100 on the basis of the detection result by the guide width detector 14f (guide width) and the detection result by the document length detector 14k (document length dimension).

Furthermore, the roller driver 14u drives each of the pickup roller 14p, paper feed roller 14q, respective conveyance rollers 14r, resist roller 14s, and paper discharge roller 14t as described above. Further, the conveyance detector 14w includes respective document conveyance sensors 14v. This conveyance detector 14w detects the position (conveyance position) of the document 100 being conveyed along the document conveyance path 200, on the basis of the output signal of each of the respective document conveyance sensors 14v.

The multifunction peripheral 10 according to the present example includes a duplex reading function that reads images on both sides of the document 100 simultaneously. With this duplex reading function, images on both sides of the document 100 are read simultaneously, or strictly in parallel, using the skimming through method. In other words, as described above, the image on the front side of the document 100 is read by the image reader including the image reading unit 12b. Additionally, the image on the back side of the document 100 is read by the back side reading unit 14c.

In such a skimming through method, the document 100 may be conveyed along the document conveyance path 200 in a tilted state. This is true even when the duplex reading function is not enabled, that is, when an image on only one side (front side) of the document 100 is read using the skimming through method. To deal with this, the multifunction peripheral 10 according to the present example includes an ADF document crop function.

Figure 5:
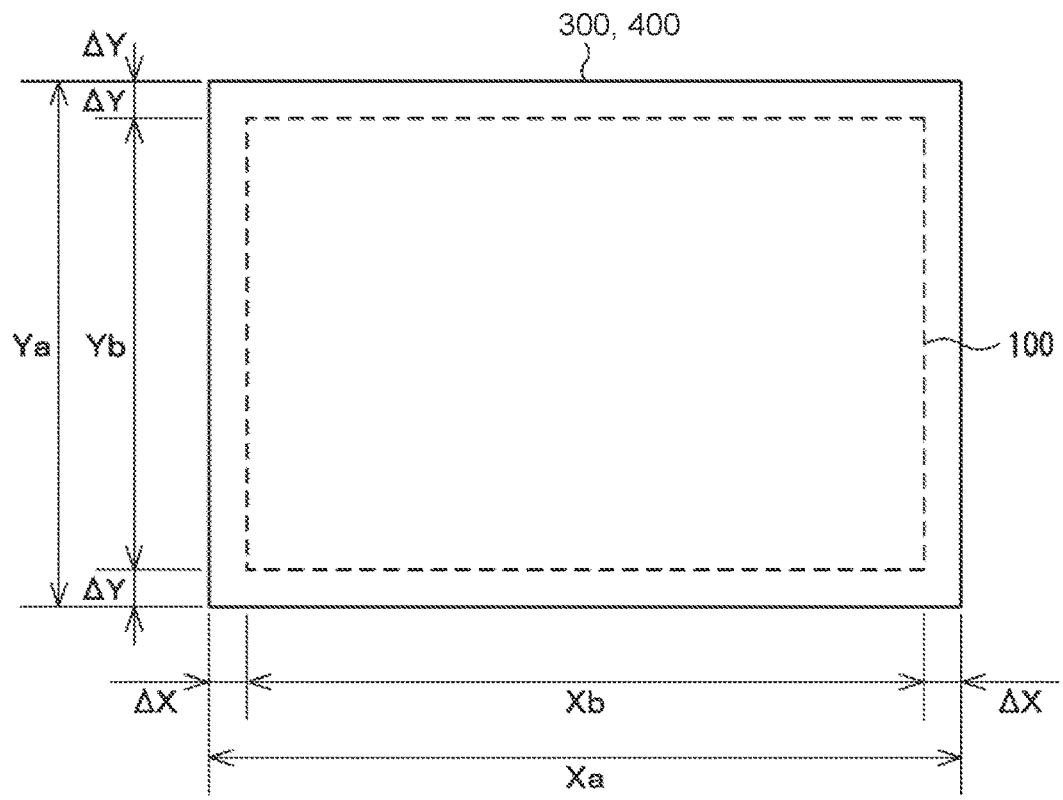
FIG. 5 is a diagram illustrating a relation between a size of a document and a reading target area in the same example.

According to this ADF document crop function, a reading target area 300 such as that illustrated in FIG. 5 is set for the image reader 12. This reading target area 300 is larger than the size of the document 100. Specifically, in the conveyance direction of the document 100, or in other words, in the sub-scanning direction, a dimension Xa of the reading target area 300 is larger than a dimension Xb of the document 100. For example, at each of the two edges (the right and left edges in FIG. 5), the dimension Xa is larger than the dimension Xb of the document 100 by a dimension ΔX. Further, in the conveyance width direction of the document 100, in other words, in the main scanning direction, a dimension Ya of the reading target area 300 is larger than a dimension Yb of the document 100. For example, at each of the two edges (the top and bottom edges in FIG. 5), the dimension Ya is larger than the dimension Yb by a dimension ΔY.

The dimension difference ΔX at each of the two edges in the sub-scanning direction is 5 mm, for example, regardless of the size of the document 100. Further, the dimension difference ΔY at each of the two edges in the main scanning direction is also 5 mm, for example, regardless of the size of the document 100. Each of the dimension difference ΔX and ΔY is not limited to this value but may be a value depending on the size of the document 100, for example. Specifically, the larger the size of the document 100, the larger the value. In addition, each dimension difference ΔX and ΔY may be different from each other, or may be set (changed) optionally.

Figure 6:
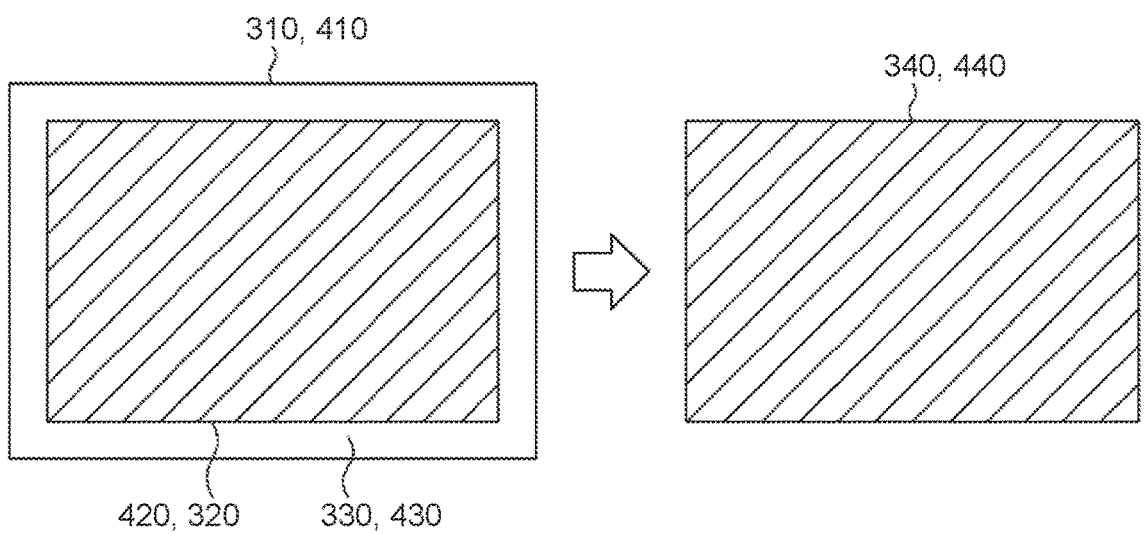
FIG. 6 is a diagram for explaining a procedure of image shaping processing in the same example.

After the reading target area 300 is set in this way, the image reading processing is performed by the image reader 12, and strictly speaking, the image reading processing is performed using the skimming through method. Suppose, for example, that the document 100 is not tilted, that is, the tilt (angle) of the document 100 is zero. In this case, a read image 310 such as that illustrated in the left figure of FIG. 6 is obtained, and strictly speaking, a read image data corresponding to the read image 310 is generated. The read image 310 illustrated in the left figure of FIG. 6 includes a front side document image 320 corresponding to the image on the front side of the document 100 and a margin area image 330 according to the aforementioned respective dimension differences ΔX and ΔY. In particular, the front side document image 320 is not tilted, that is, the tilt of the front side document image 320 is zero.

This front side read image 310, strictly speaking, the read image data of the front side corresponding to the read image 310, is subjected to the image processing by the image processor 24, in particular, subjected to front side image shaping processing. In this front side image shaping processing, cropping is performed to cut out the front side document image 320 from the front side read image 310. As a result, the front side document image 320 is cut out from the front side read image 310, and a front side shaped image 340 such as that illustrated in the right figure of FIG. 6 is obtained. This front side shaped image 340, strictly speaking, the image data corresponding to the front side shaped image 340 is output from the image processor 24 as image data after the image processing by the image processor 24.

Figure 7:
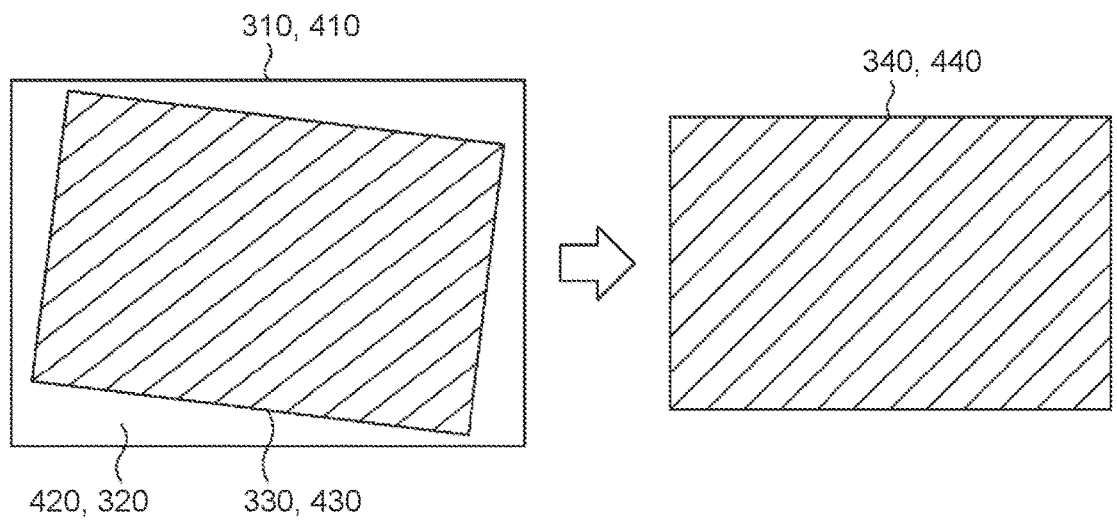
FIG. 7 is a diagram for explaining a procedure of image shaping processing in the same example.

In contrast, if the document 100 is conveyed in a tilted state, the read image 310 such as that illustrated in the left figure of FIG. 7 is obtained. The front side document image 320 in the read image 310 illustrated in the left figure of FIG. 7 is tilted at an angle according to the tilt of the document 100.

The read image 310 including such a tilted front side document image 320 is also subjected to the front side image shaping processing by the image processor 24. That is, cropping is performed to cut out the front side document image 320 from the read image 310. Furthermore, when the tilt of the front side document image 320 is equal to or more than a predetermined degree, tilt correction processing is performed to correct the tilt of the front side document image 320. That is, tilt correction processing is performed to set the tilt of the front side document image 320 to zero. As a result, the front side shaped image 340 such as that illustrated in the right figure of FIG. 7 is obtained. That is, the front side shaped image 340 similar to that illustrated in the right figure of FIG. 6 is obtained. Further, the image data corresponding to the front side shaped image 340 is output from the image processor 24 as image data after the image processing by the image processor 24.

The tilt correction processing may be performed after the cropping or before the cropping. In other words, the cropping may be performed and then the tilt correction processing may be performed, or conversely, the tilt correction processing may be performed and then the cropping may be performed. In addition, the predetermined degree referred to here, that is, the tilt degree of the front side document image 320, which is the boundary of whether the tilt correction processing is to be performed, is, for example, 0.5 degrees in terms of angle, but is not limited to this value. This predetermined degree may also be set (or changed) optionally.

Furthermore, when the duplex reading function is enabled, a reading target area 400 similar to that illustrated in FIG. 5 is set for the back side reading unit 14c, and strictly speaking, a reading target area for the back side 400 conjugate to the reading target area for the front side 300 is set. Then, the image reading processing is performed by the back side reading unit 14c to read the image on the back side of the document 100.

Here, suppose, for example, that the document 100 is not tilted, that is, the tilt of the document 100 is zero. In this case, a back side read image 410 similar to that illustrated in the left figure of FIG. 6 is obtained. Similarly to the front side read image 310, the back side read image 410 also includes a back side document image 420 corresponding to the image on the back side of the document 100 and a margin area image 430 according to the aforementioned respective dimension differences ΔX and ΔY. In particular, the back side document image 420 is not tilted, that is, the tilt of the back side document image 420 is zero.

This back side read image 410, strictly speaking, the read image data of the back side corresponding to the read image 410, is subjected to the image processing by the image processor 24, in particular, subjected to back side image shaping processing. In this back side image shaping processing, similarly to the front side image shaping processing, cropping is performed to cut out the back side document image 420 from the back side read image 410. As a result, the back side document image 420 is cut out from the back side read image 410, and a back side shaped image 440 similar to that illustrated in the right figure of FIG. 6 is obtained. This back side shaped image 440, strictly speaking, the image data corresponding to the back side shaped image 440 is output from the image processor 24 as image data after the image processing by the image processor 24, together with the image data corresponding to the aforementioned front side shaped image 340.

In contrast, if the document 100 is conveyed in a tilted state, the back side read image 410 similar to that illustrated in the left figure of FIG. 7 is obtained. The back side document image 420 in this back side read image 410 is tilted at an angle according to the tilt of the document 100.

The read image 410 including such a tilted back side document image 420 is also subjected to the back side image shaping processing by the image processor 24. That is, cropping is performed to cut out the back side document image 420 from the read image 410. Furthermore, when the tilt of the back side document image 420 is equal to or more than a predetermined degree, tilt correction processing is performed to correct the tilt of the back side document image 420. That is, tilt correction processing is performed to set the tilt of the back side document image 420 to zero. As a result, the back side shaped image 440 similar to that illustrated in the right figure of FIG. 7 is obtained. That is, the back side shaped image 440 similar to that illustrated in the right figure of FIG. 6 is obtained. Then, the image data corresponding to the back side shaped image 440 is output from the image processor 24 as image data after the image processing by the image processor 24, together with the image data corresponding to the front side shaped image 340.

Figure 8:
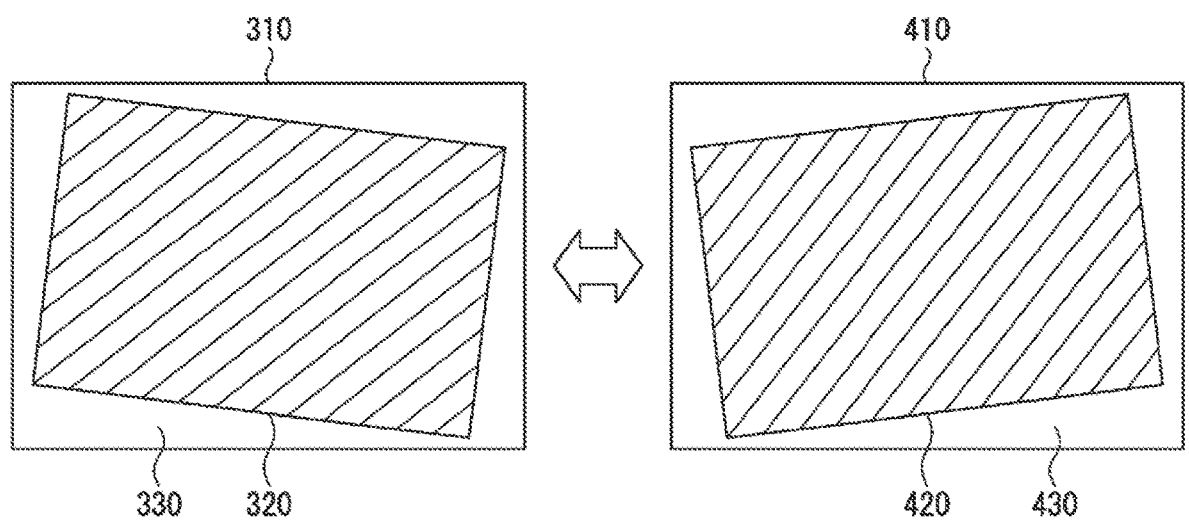
FIG. 8 is a diagram illustrating an example of a front side read image and a back side read image.

Here, comparing the front side read image 310 and the back side read image 410 obtained by the duplex reading function, they are as illustrated in FIG. 8, for example. As illustrated in FIG. 8, the position, dimensions, shape, tilt, and the like of the front side document image 320 in the front side read image 310 and the position, dimensions, shape, tilt, and the like of the back side document image 420 in the back side read image 410 are symmetrical (line-symmetrical) and, so to speak, conjugate to each other. In other words, the coordinates of the area occupied by the front side document image 320 in the front side read image 310 and the coordinates of the area occupied by the back side document image 420 in the back side read image 410 are conjugate to each other.

Focusing on this point, the image processor 24 performs the back side image shaping processing on the basis of the shaping information including the parameters and algorithms in the front side image shaping processing. In other words, the back side image shaping processing is performed with the use of the shaping information in the front side image shaping processing. This simplifies the back side image shaping processing and greatly reduces the burden on the image processor 24 which is responsible for the back side image shaping processing.

In addition, in the ADF document crop function, when the size of the document 100 is or larger than a predetermined size, the document 100 is conveyed at a set speed set as the conveyance speed of the document 100 by the ADF 14. In contrast, when the size of the document 100 is smaller than the predetermined size, the document 100 is conveyed at the lowest speed that can be set as the conveyance speed of the document 100 by the ADF 14. This is to prevent the occurrence of jams in the ADF 14, especially when the size of the document 100 is smaller than a predetermined size, that is, when the size of the document 100 is small enough to cause jams.

The conveyance speed of the document 100 by the ADF 14 depends on the reading resolutions of the image reader 12 and the back side reading unit 14c. In other words, when the size of the document 100 is smaller than the predetermined size, the reading resolutions of the image reader 12 and the back side reading unit 14c are set to the highest value that can be set as the reading resolution, such as 600 dpi. This allows the ADF 14 to convey the document 100 at the conveyance speed corresponding to the reading resolution of 600 dpi, that is, at the lowest speed that can be set as the conveyance speed. In contrast, when the size of the document 100 is or larger than the predetermined size, the reading resolutions of the image reader 12 and the back side reading unit 14c are set in accordance with a value set automatically or manually in advance. Then, the ADF 14 conveys the document 100 at the conveyance speed corresponding to the set reading resolution.

The predetermined size referred to here, that is, the size that serves as the boundary for setting either the lowest speed or the set speed for the conveyance speed of the ADF 14, can be set (or changed) as desired. For example, the size may be slightly larger than the postcard size (148 mm*100 mm). In this case, when the size of the document 100 is a postcard size or smaller, the reading resolutions of the image reader 12 and the back side reading unit 14c are set to the highest value of 600 dpi. Accordingly, the document 100 is conveyed at the lowest speed that can be set as the conveyance speed of the document 100 by the ADF 14. Further, when the size of the document 100 is larger than a postcard size, the reading resolutions of the image reader 12 and the back side reading unit 14c are set in accordance with a value set automatically or manually. Accordingly, the ADF 14 conveys the document 100 at the conveyance speed corresponding to the set reading resolution. The size of the document 100 is recognized on the basis of the detection result by the document size detection function described above.

For example, even in a case where the reading resolutions of the image reader 12 and the back side reading unit 14c are manually set to a value other than 600 dpi (i.e., a value smaller than 600 dpi), if the size of the document 100 is smaller than a predetermined size, the reading resolutions of the image reader 12 and the back side reading unit 14c are, so to speak, forcibly set to a value of 600 dpi. As a result, the image resolutions of the front side read image 310 and the back side read image 410 (when the duplex reading function is not enabled, the front side read image 310), in other words, the image resolutions of the front side shaped image 340 and the back side shaped image 440 (when the duplex reading function is not enabled, the front side shaped image 340) are 600 dpi, that is, a value different from the manually set value.

In order to correct such discrepancy, in a case where the reading resolutions of the image reader 12 and the back side reading unit 14c are manually set to a value other than 600 dpi and the size of the document 100 is a predetermined size, the image resolutions of the front side shaped image 340 and the back side shaped image 440 (when the duplex reading function is not enabled, the front side shaped image 340) are converted from the value of 600 dpi to a value corresponding to the manually set (so to speak, desired) reading resolution. This processing is also handled, for example, by the image processor 24. The front side shaped image 340 and the back side shaped image 440 after converting the image resolution in this way are output from the image processor 24 as image data after the image processing by the image processor 24.

Moreover, the ADF document crop function, strictly speaking, the ADF document crop function when the multifunction peripheral 10 is used as an image scanner includes an electronic business card conversion function as one of its ancillary functions (sub-functions). According to this electronic business card conversion function, in a case where the document 100 is a business card, the character information contained in the business card can be digitized, that is, the document 100 can be converted into an electronic business card.

Specifically, according to the electronic business card conversion function, for example, data origination processing is performed in which a character image contained in the front side shaped image 340 and the back side shaped image 440 (when the duplex reading function is not enabled, the front side shaped image 340) is converted into character data (character code). So-called OCR processing is performed. The character data obtained by this data origination processing is further compiled into an electronic file of a predetermined format by file conversion processing. As for the electronic file of a predetermined format, either a VCF file or a CSV file can be selected as desired. The electronic file, so to speak, electronic business card data, generated by this file conversion processing is output together with and in the state of being linked to the image data of the original front side shaped image 340 and back side shaped image 440, and for example, is stored in the auxiliary storage 28 or output to the outside via the communicator 30. The data origination processing is handled by, for example, the image processor 24. Further, the file conversion processing is handled by, for example, the CPU 26a.

More specifically, before the data origination processing is performed, the image resolutions of the front side shaped image 340 and the back side shaped image 440 that are subject to the data origination processing are converted to a predetermined resolution, so to speak, dropped. In other words, when the document 100 is a business card, that is, when the size of the document 100 is smaller than the aforementioned predetermined size, the image resolutions of the front side shaped image 340 and the back side shaped image 440 are 600 dpi as described above. If the front side shaped image 340 and the back side shaped image 440 are subjected to data origination processing while keeping this image resolution of 600 dpi, the image processor 24 which is responsible for the data processing will be heavily burdened. In order to reduce the burden on the image processor 24, the image resolution of 600 dpi of the front side shaped image 340 and the back side shaped image 440 is reduced to a predetermined resolution, for example, 300 dpi. In this way, the image resolutions of the front side shaped image 340 and the back side shaped image 440 are reduced to a predetermined resolution, and then the front side shaped image 340 and the back side shaped image 440 are subjected to data origination processing. This greatly reduces the burden on the image processor 24 which is responsible for the data origination processing. The predetermined resolution referred to here is not limited to 300 dpi, but may be any other value such as 400 dpi.

Whether the document 100 is a business card is determined, assuming that the electronic business card conversion function is enabled, for example, on the basis of the size of the document 100, or in other words, on the basis of the detection result by the document size detection function described above. Instead of the size of the document 100, whether the document 100 is a business card may be determined on the basis of the size of at least one of the front side shaped image 340 and the back side shaped image 440, for example. In either case, the determination criteria, or threshold, may be set (or changed) optionally.

Figure 9:
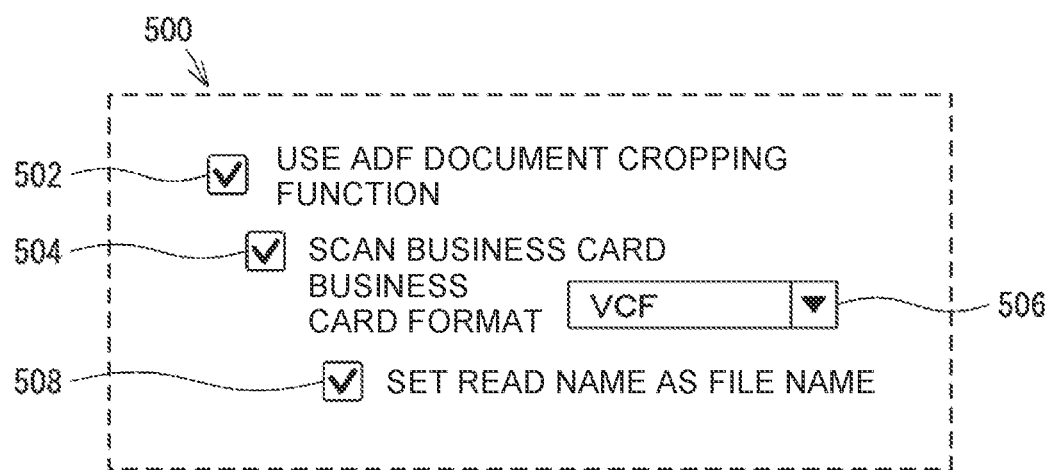
FIG. 9 is a diagram illustrating a part of a setting screen in the same example.
Figure 10:
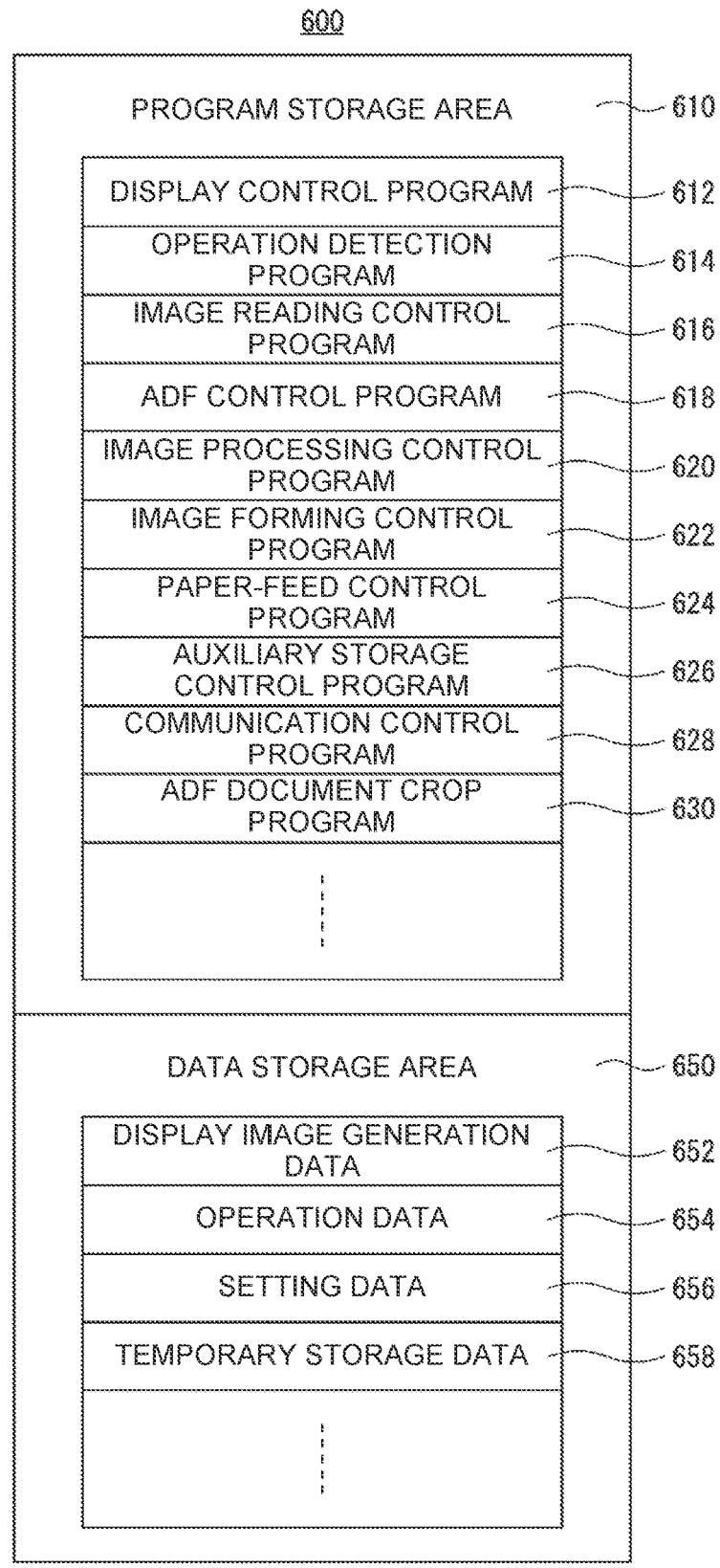
FIG. 10 is a memory map conceptually illustrating a configuration in a RAM of a main storage in the same example.

FIG. 9 illustrates a portion of a setting screen 500 when the multifunction peripheral 10 is used as an image scanner, that is, a setting screen 500 for the image scanner function. In this setting screen 500, a checkbox 502 for setting (selecting) whether to enable the ADF document crop function is provided. In other words, the ADF document crop function is enabled (set to be enabled) by placing a check mark in the checkbox 502. Further, when the check mark in the checkbox 502 is removed, the ADF document crop function is disabled. In FIG. 9, the checkbox 502 is marked with a check mark, which means that the ADF document crop function is enabled.

Additionally, in this setting screen 500, a checkbox 504 for setting whether to enable the electronic business card conversion function is provided. In other words, the electronic business card conversion function is enabled by placing a check mark in the checkbox 504. Further, when the check mark in the checkbox 504 is removed, the electronic business card conversion function is disabled. In FIG. 9, the checkbox 504 is marked with a check mark, which means that the electronic business card conversion function is enabled. In addition, although not illustrated in the figure, when the check mark in the aforementioned checkbox 502 is removed, that is, when the ADF document crop function is disabled, the checkbox 504 is grayed out. In other words, by placing a check mark in the aforementioned checkbox 502, that is, by enabling the ADF document crop function, the checkbox 504 can be operated.

Furthermore, in the setting screen 500, a drop-down list 506 for selecting the file format of the aforementioned electronic business card data is provided. With this drop-down list 506, either VCF file or CSV file can be selected as desired as the file format of the electronic business card data. In FIG. 9, the VCF file is selected as the file format of the electronic business card data. In addition, although not illustrated in the figure, when the check mark in the checkbox 504 is removed, that is, when the electronic business card conversion function is disabled, the drop-down list 506 is grayed out. In other words, by placing a check mark in the checkbox 504, that is, by enabling the electronic business card conversion function, the drop-down list 506 can be operated.

Moreover, in the setting screen 500, a checkbox 508 for setting whether to use the name contained in the electronic business card data as the file name of the electronic business card data is provided. In other words, when the check mark is placed in the checkbox 508, the name contained in the electronic business card data is set as the file name of the electronic business card data. On the other hand, when the check mark in the checkbox 508 is removed, it is possible to set any file name as the file name of the electronic business card data. In FIG. 9, the check mark is placed in the checkbox 508, which means that the name contained in the electronic business card data can be set as the file name of the electronic business card data. In addition, although not illustrated in the figure, when the check mark in the aforementioned checkbox 504 is removed, that is, when the electronic business card conversion function is disabled, the checkbox 508 is grayed out. In other words, by placing a check mark in the aforementioned checkbox 504, that is, by enabling the electronic business card conversion function, the checkbox 508 can be operated.

The setting of whether to enable the duplex reading function is made on a common setting screen (not illustrated). In other words, the duplex reading function can be enabled or disabled by operating on the common setting screen (not illustrated).

Figure 12:
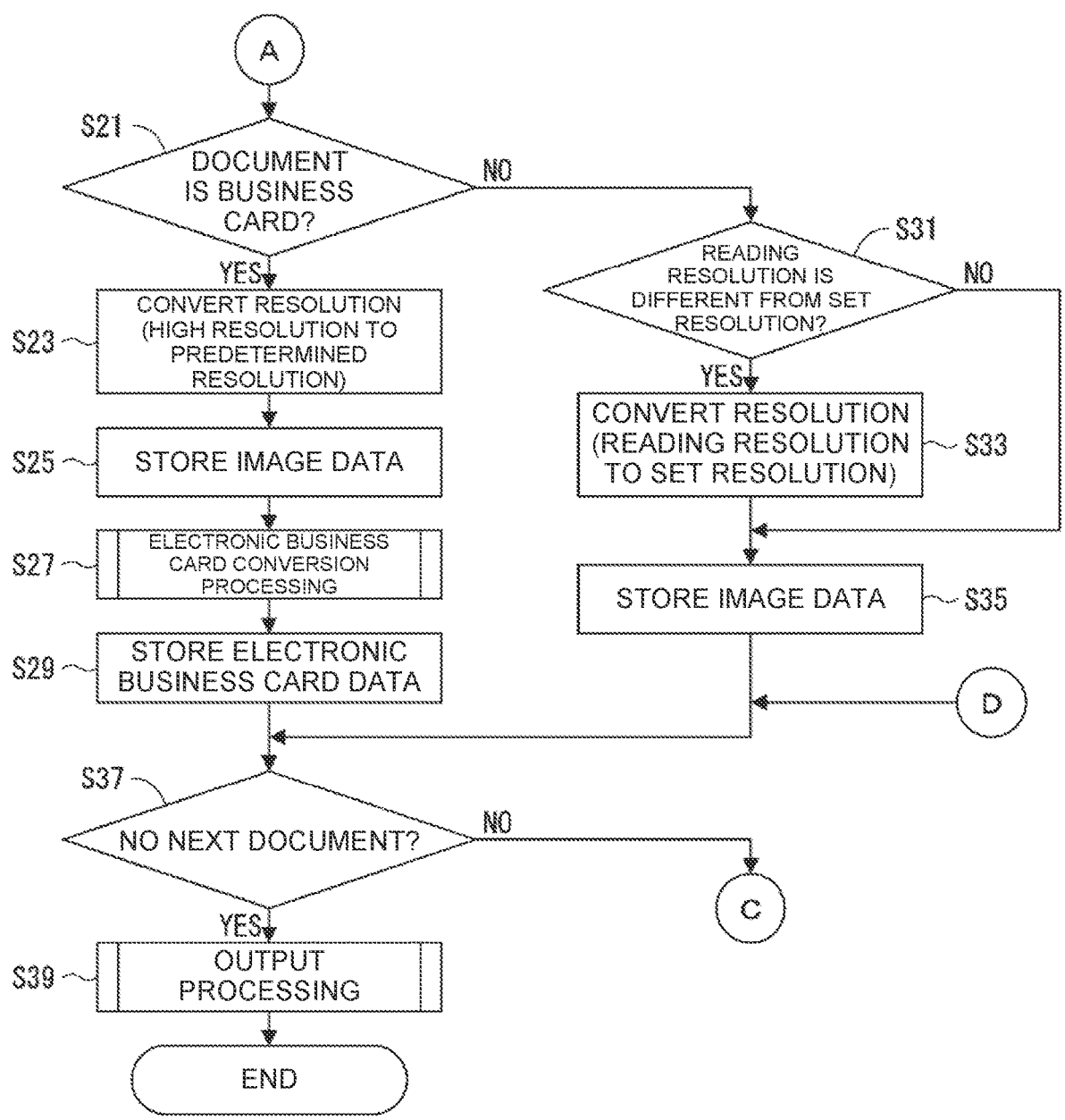
FIG. 12 is a flow diagram illustrating a flow of another part of the ADF document crop task in the same example.

FIG. 12 is a memory map 600 conceptually representing a configuration in the RAM of the main storage 26b. As illustrated in this memory map 600, the RAM includes a program storage area 610 and a data storage area 650.

The program storage area 610 stores the aforementioned control program. Specifically, the control program includes a display control program 612, an operation detection program 614, an image reading control program 616, an ADF control program 618, an image processing control program 620, an image forming control program 622, a paper-feed control program 624, an auxiliary storage control program 626, and a communication control program 628. Additionally, the control program includes an ADF document crop program 630.

The display control program 612 is a program for generating the display screen data necessary for displaying, on the display 22b, various screens such as the aforementioned setting screen 500. The operation detection program 614 is a program for detecting a state of an operation to the touch panel 22a. The image reading control program 616 is a program to control the image reader 12. The ADF control program 618 is a program to control the ADF 14. The image processing control program 620 is a program to control the image processor 24. The image forming control program 622 is a program to control the image former 16. The paper-feed control program 624 is a program to control the paper feeder 20. The auxiliary storage control program 626 is a program to control the auxiliary storage 28. The communication control program 628 is a program to control the communicator 30. Further, the ADF document crop program 630 is a program to implement the ADF document crop function, and specifically, is a program to cause the CPU 26a to execute the ADF document crop task described below.

Meanwhile, the data storage area 650 stores various types of data. These various types of data include display image generation data 652, operation data 654, setting data 656, temporary storage data 658, and the like.

The display image generation data 652 is data such as polygon data and texture data to be used to generate the display screen data based on the display control program 612 described above. The operation data 654 is data representing the state of an operation to the touch panel 22a, specifically, time-series data representing the touch position (coordinates) of the user to the touch panel 22a. The setting data 656 is data representing appropriate setting content, such as the setting content by the aforementioned setting screen 500. Further, the temporary storage data 658 is the aforementioned shaping information and other appropriate data that is temporarily stored.

Figure 11:
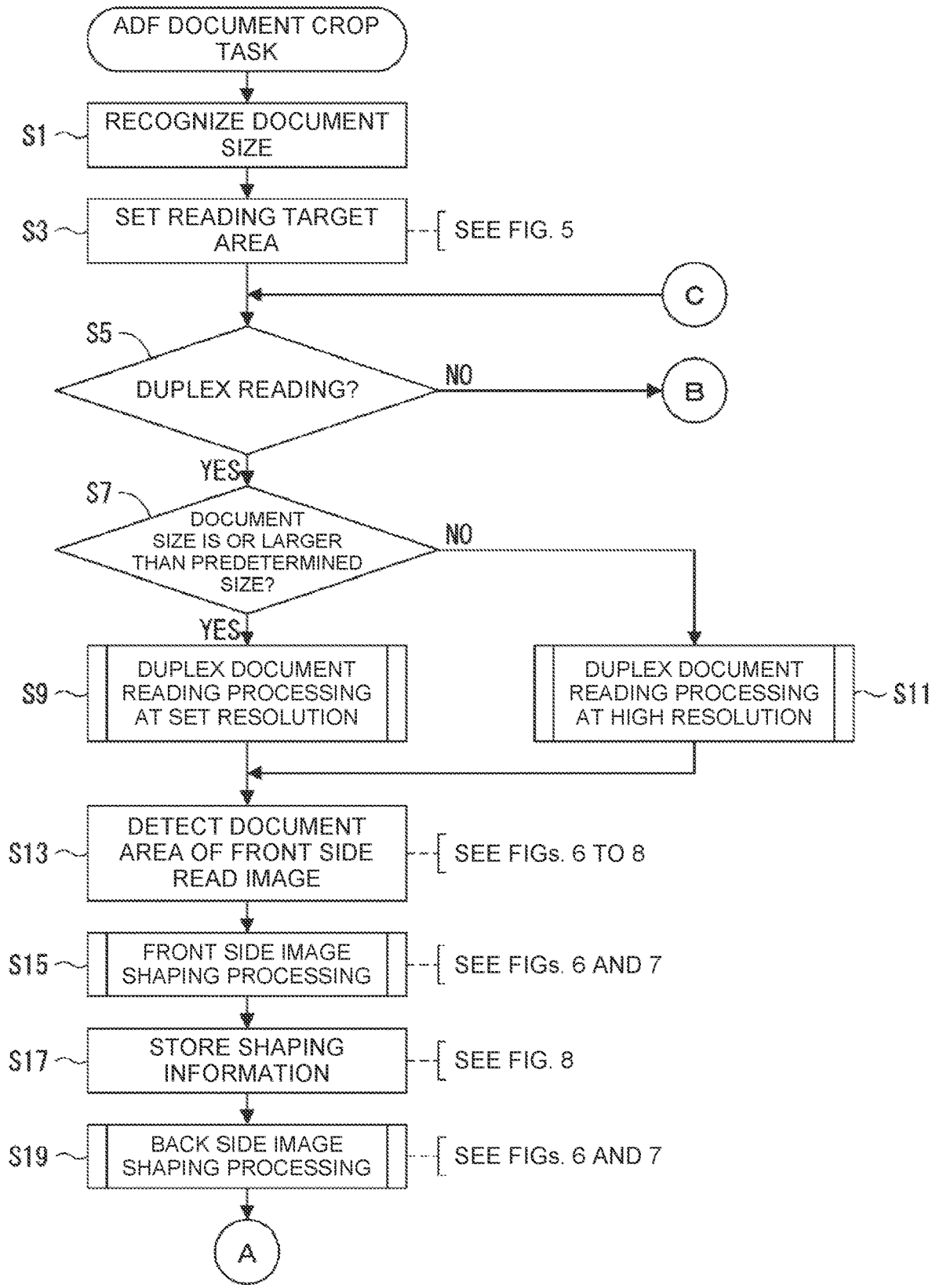
FIG. 11 is a flow diagram of a flow of a part of an ADF document crop task in the same example.
Figure 13:
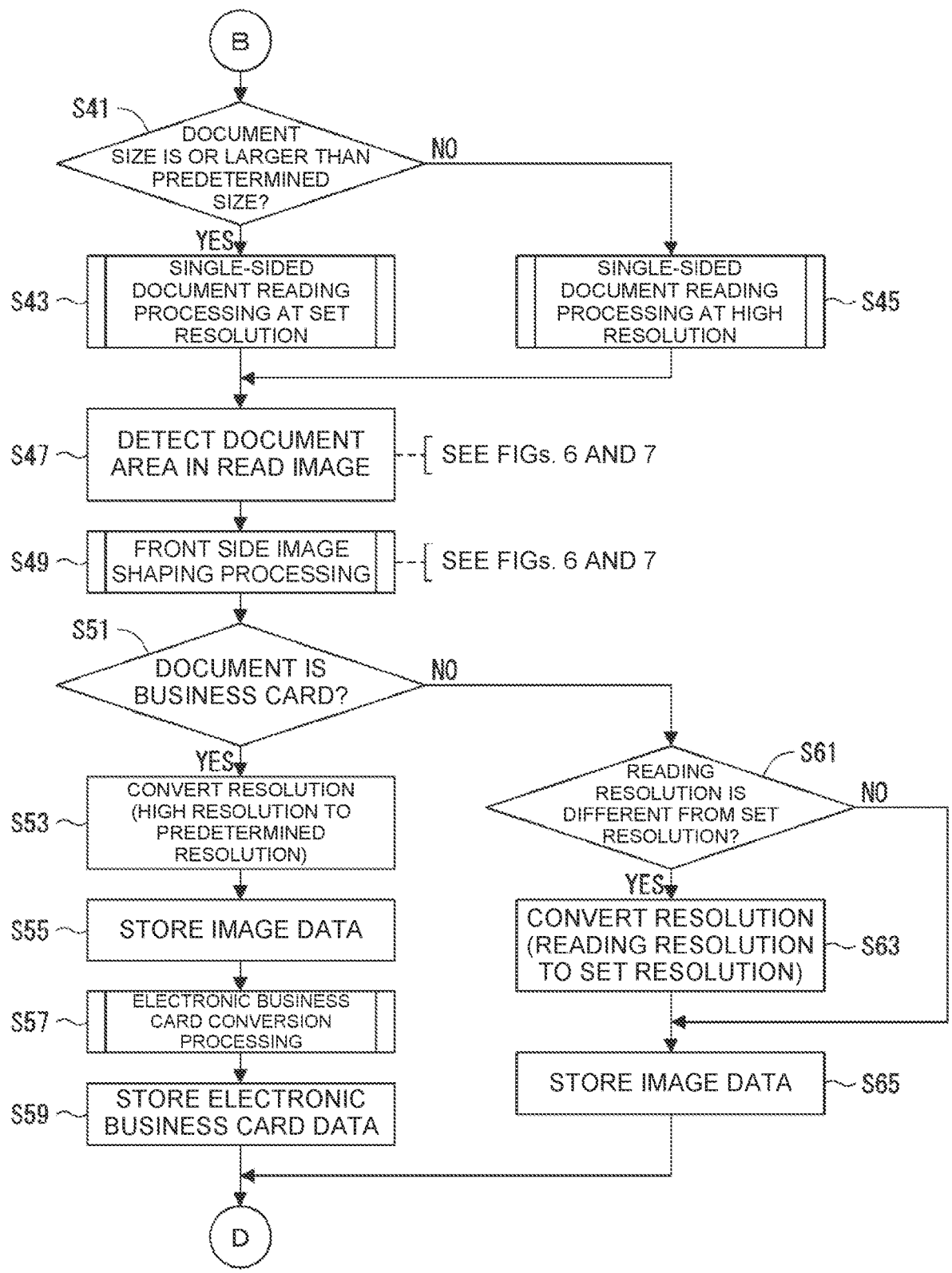
FIG. 13 is a flow diagram illustrating a flow of a remaining part of the ADF document crop task in the same example.

In order to implement the ADF document crop function, the CPU 26a executes the ADF document crop task in accordance with the ADF document crop program 630. The flow of this ADF document crop task, particularly when the multifunction peripheral 10 is used as an image scanner, is illustrated in FIGS. 11 to 13. In a state where one or more documents 100 are placed on the document placement tray 14a, when the operation instructing the start of the feeding operation of the document 100 by the ADF 14 is accepted, that is, when a start key (not illustrated) is operated, in response to this, the CPU 26a executes the ADF document crop task. In addition, the execution of the ADF document crop task assumes that the ADF document crop function is enabled.

According to this ADF document crop task, in step S1, the CPU 26a first recognizes the size of the document 100, more specifically, the size of the document 100 placed on the document placement tray 14a. This recognition is based on the detection result by the document size detection function described above. A plurality of documents 100 of different sizes may be placed on the document placement tray 14a. In this case, the size of the largest document 100 is recognized. Then, the CPU 26a advances the processing to step S3.

In step S3, the CPU 26a sets the reading target areas 300 and 400 according to the size of the document 100 on the basis of the size of the document 100 recognized in step S1. Strictly speaking, when the duplex reading function is enabled, the CPU 26a sets both the reading target area for the front side 300 and the reading target area for the back side 300. On the other hand, when the duplex reading function is not enabled, the CPU 26a sets only the reading target area for the front side 300. Then, the CPU 26a advances the processing to step S5.

In step S5, the CPU 26a determines whether the duplex reading function is enabled. Here, for example, if the duplex reading function is enabled (S5: YES), the CPU 26a advances the processing to step S7. On the other hand, if the duplex reading function is not enabled (S5: NO), the CPU 26a advances the processing to step S41 described below.

In step S7, the CPU 26a determines whether the size of the document 100 is or larger than the predetermined size described above. Here, for example, if the size of the document 100 is or larger than the predetermined size (S7: YES), the CPU 26a advances the processing to step S9. On the other hand, if the size of the document 100 is smaller than the predetermined size (S7: NO), the CPU 26a advances the processing to step S11 described below.

In step S9, the CPU 26a controls the ADF 14 in such a manner that the ADF 14 feeds only one document 100. Then, the CPU 26a controls the image reader 12 and the back side reading unit 14c in such a manner that the image reading processing by the image reader 12 and the back side reading unit 14c is performed at a reading resolution set automatically or manually in advance. As a result, the front side read image 310 and the back side read image 410 with an image resolution corresponding to the set resolution are obtained. After execution of this step S9, the CPU 26a advances the processing to step S13.

In contrast, when advancing the processing from the aforementioned step S7 to step S11, in step S11, the CPU 26a controls the ADF 14 in such a manner that the ADF 14 feeds only one document 100. Then, the CPU 26a controls the image reader 12 and the back side reading unit 14c in such a manner that the image reading processing by the image reader 12 and the back side reading unit 14c is performed at the highest reading resolution of 600 dpi. As a result, the front side read image 310 and the back side read image 410 with a high image resolution of 600 dpi is obtained. After execution of this step S11, the CPU 26a advances the processing to step S13.

In step S13, the CPU 26a detects the area occupied by the front side document image 320 in the front side read image 310, so to speak, the document area, more specifically, detects the coordinates of the document area, and strictly speaking, controls the image processor 24 so as to do so. Then, the CPU 26a advances the processing to step S15.

In step S15, the CPU 26a performs the front side image shaping processing on the basis of the detection result in step S13, and strictly speaking, controls the image processor 24 to do so. This will cut out the front side document image 320 from the front side read image 310. Additionally, when the front side document image 320 is tilted to or more than a predetermined degree, the tilt of the front side document image 320 is corrected. Further, the front side shaped image 340 is obtained. After execution of this step S15, the CPU 26a advances the processing to step S17.

In step S17, the CPU 26a stores the shaping information in the front side image shaping processing of step S15, and more specifically, stores the shaping information as one of the temporary storage data 658 described above. Then, the CPU 26a advances the processing to step S19.

In step S19, the CPU 26a performs the back side image shaping processing on the basis of the shaping information stored in step S17, and strictly speaking, controls the image processor 24 to do so. In other words, the image processor 24 performs the back side image shaping processing on the basis of the shaping information stored in step S17, that is, with the use of the shaping information. This will cut out the back side document image 420 from the back side read image 410. Additionally, if the back side document image 420 is tilted to or more than a predetermined degree, the tilt of the back side document image 420 is corrected. Further, the back side shaped image 440 is obtained. After execution of this step S19, the CPU 26a advances the processing to step S21.

In step S21, the CPU 26a determines whether the document 100 is a business card. In other words, the CPU 26a determines that the document 100 is a business card when the electronic business card conversion function is enabled and the size of the document 100 is considered to be the size of a business card. Otherwise, the CPU 26a determines that the document 100 is not a business card. Instead of the size of the document 100, whether the document 100 is a business card may be determined on the basis of the size of at least one of the front side shaped image 340 and the back side document image 420. In this step S21, for example, if the document 100 is a business card (S21: YES), the CPU 26a advances the processing to step S23. In contrast, if the document 100 is not a business card (S21: NO), the CPU 26a advances the processing to step S31 described below.

In step S23, the CPU 26a converts the image resolutions of the front side shaped image 340 and the back side shaped image 440 to a predetermined resolution, more specifically, drops the image resolutions from 600 dpi to 300 dpi, and strictly speaking, controls the image processor 24 to do so. Then, the CPU 26a advances the processing to step S25.

In step S25, the CPU 26a stores the image data of the front side shaped image 340 and the back side shaped image 440 after the image resolutions are converted in step S23, and more specifically, stores the image data as one of the temporary storage data 658 described above. Then, the CPU 26a advances the processing to step S27.

In step S27, the CPU 26a performs the electronic business card conversion processing. In other words, the CPU 26a performs data origination processing for converting the character image contained in the front side shaped image 340 and the back side shaped image 440 stored in step S25 into character data, and strictly speaking, controls the image processor 24 to do so. Furthermore, the CPU 26a performs file conversion processing for compiling character data obtained by the data origination processing into an electronic file of a predetermined format. In this file conversion processing, the character data is compiled into an electronic file of the file format set in the aforementioned setting screen 500, that is, the electronic business card data of the file format is generated. Additionally, the name contained in the electronic business card data is attached as the file name of the electronic business card data, and an appropriate file name is attached to the electronic business card data. After execution of this step S27, the CPU 26a advances the processing to step S29.

In step S29, the CPU 26a stores the electronic business card data generated in step S27, more specifically, stores same as one of the temporary storage data 658 described above, and more specifically, stores same in the state of being linked to the image data stored in step S25. Then, the CPU 26a advances the processing to step S37.

Furthermore, when advancing the processing from the aforementioned step S21 to step S31, in step S31, the CPU 26a determines whether the reading resolutions of the image reader 12 and the back side reading unit 14c are different from the manually set resolution. Here, for example, if the reading resolution is different from the set resolution, that is, if the reading resolution is higher than the set resolution (S31: YES), the CPU 26a advances the processing to step S33. On the other hand, if the reading resolution is the same as the set resolution (S31: NO), the CPU 26a skips step S33 and advances the processing to step S35.

In step S33, the CPU 26a converts the image resolutions of the front side shaped image 340 and the back side shaped image 440 to the set resolution, and strictly speaking, controls the image processor 24 to do so. Then, the CPU 26a advances the processing to step S35.

In step S35, the CPU 26a stores the image data of the front side shaped image 340 and the back side shaped image 440 after the image resolutions are converted in step S33, and more specifically, stores the image data as one of the temporary storage data 658 described above. Then, the CPU 26a advances the processing to step S37.

In step S37, the CPU 26a determines whether the next document 100 is present, that is, whether the document 100 is placed on the document placement tray 14a. Here, for example, if the next document 100 is present, that is, the document 100 is placed on the document placement tray 14a (S37: NO), the CPU 26a returns the processing to step S5. On the other hand, if the next document 100 is not present, that is, the document 100 is not placed on the document placement tray 14a (S37: YES), the CPU 26a advances the processing to step S39.

In step S39, the CPU 26a performs output processing for outputting the image data stored in step S25 or step S35. In particular, the image data stored in step S25 is output in the state of being linked to the electronic business card data stored in step S29. The image data output in the output processing of step S39 is stored in, for example, the auxiliary storage 28, or is output to the outside via the communicator 30.

In addition, when advancing the processing from the aforementioned step S5 to step S41, that is, when the duplex reading function is not enabled, in step S41, the CPU 26a determines whether the size of the document 100 is or larger than the predetermined size. Here, for example, if the size of the document 100 is or larger than the predetermined size (S41: YES), the CPU 26a advances the processing to step S43. On the other hand, if the size of the document 100 is smaller than the predetermined size (S41: NO), the CPU 26a advances the processing to step S45 described below.

In step S43, the CPU 26a controls the ADF 14 in such a manner that the ADF 14 feeds only one document 100. Then, the CPU 26a controls the image reader 12 in such a manner that the image reading processing by the image reader 12 is performed at a reading resolution set automatically or manually in advance, that is, in such a manner that the image reading processing for reading the image on only the front side (one side) of the document 100 is performed. As a result, the front side read image 310 with an image resolution corresponding to the set resolution is obtained. After execution of this step S43, the CPU 26a advances the processing to step S47.

In contrast, when advancing the processing from the aforementioned step S41 to step S45, in step S45, the CPU 26a controls the ADF 14 in such a manner that the ADF 14 feeds only one document 100. Then, the CPU 26a controls the image reader 12 in such a manner that the image reading processing by the image reader 12 is performed at a highest reading resolution of 600 dpi, that is, in such a manner that the image reading processing for reading the image on only the front side of the document 100 is performed. As a result, the front side read image 310 with a high image resolution of 600 dpi is obtained. After execution of this step S45, the CPU 26a advances the processing to step S47.

In step S47, in the same manner as in step S13 described above, the CPU 26a detects the area occupied by the front side document image 320 in the front side read image 310, that is, the document area, and strictly speaking, controls the image processor 24 so as to do so. Then, the CPU 26a advances the processing to step S49.

In step S47, in the same manner as in step S15 described above, the CPU 26a performs the front side image shaping processing, and strictly speaking, controls the image processor 24 to do so. As a result, the front side shaped image 340 is obtained. Then, the CPU 26a advances the processing to step S51.

In step S51, in the same manner as in the aforementioned step S21, the CPU 26a determines whether the document 100 is a business card. Here, for example, if the document 100 is a business card (S51: YES), the CPU 26a advances the processing to step S53. On the other hand, if the document 100 is not a business card (S51: NO), the CPU 26a advances the processing to step S61 described below.

In step S53, the CPU 26a converts the image resolution of the front side shaped image 340 to a predetermined resolution, more specifically, drops the image resolution from 600 dpi to 300 dpi, and strictly speaking, controls the image processor 24 to do so. Then, the CPU 26a advances the processing to step S55.

In step S55, the CPU 26a stores the image data of the front side shaped image 340 after the image resolution is converted in step S23, and more specifically, stores the image data as one of the temporary storage data 658 described above. Then, the CPU 26a advances the processing to step S57.

In step S57, the CPU 26a performs the electronic business card conversion processing on the front side shaped image 340 stored in step S55. As a result, electronic business card data is generated. The file format of this electronic business card data follows the file format set in the aforementioned setting screen 500. Additionally, the name contained in the electronic business card data is attached as the file name of the electronic business card data, and an appropriate file name is attached to the electronic business card data. After execution of this step S57, the CPU 26a advances the processing to step S59.

In step S59, the CPU 26a stores the electronic business card data generated in step S57, specifically, stores same as one of the temporary storage data 658 described above, and more specifically, stores same in the state of being linked to the image data stored in step S55. Then, the CPU 26a advances the processing to the aforementioned step S37.

In addition, when advancing the processing from step S51 to step S61, in step S61, the CPU 26a determines whether the reading resolution of the image reader 12 is different from the manually set resolution. Here, for example, if the reading resolution is different from the set resolution, that is, if the reading resolution is higher than the set resolution (S61: YES), the CPU 26a advances the processing to step S63. On the other hand, if the reading resolution is the same as the set resolution (S61: NO), the CPU 26a skips step S63 and advances the processing to step S65.

In step S63, the CPU 26a converts the image resolution of the front side shaped image 340 to the set resolution, and strictly speaking, controls the image processor 24 to do so. Then, the CPU 26a advances the processing to step S65.

In step S65, the CPU 26a stores the image data of the front side shaped image 340 after the image resolution is converted in step S63, and more specifically, stores the image data as one of the temporary storage data 658 described above. Then, the CPU 26a advances the processing to step S37.

When step S55 or step S65 is executed, in the output processing of step S39 described above, the image data stored in step S55 or step S65 is output. In particular, the image data stored in step S55 is output in the state of being linked to the electronic business card data stored in step S59. These image data is stored in, for example, the auxiliary storage 28, or is output to the outside via the communicator 30.

As described above, according to the present example, particularly according to the ADF document crop function, even if the document 100 is conveyed in a tilted state, the document 100 can be properly handled. In particular, when the duplex reading function is enabled, the back side image shaping processing for obtaining the back side shaped image 440 is performed on the basis of the shaping information in the front side image shaping processing for obtaining the front side shaped image 340. This simplifies the back side image shaping processing and greatly reduces the burden on the image processor 24 which is responsible for the back side image shaping processing. In addition, unlike the technique disclosed in the aforementioned Japanese Unexamined Patent Application Publication No. 2011-86988, the present example does not require any mechanical mechanism to correct the document tilt itself, nor any ancillary elements such as a sensor to detect the orientation of the document. In other words, the present example makes it possible to deal with a document 100 conveyed in a tilted state with a simple configuration and simple processing.

The ADF 14 in the present example is an example of the conveyer according to the present invention. In addition, the image reader 12 including the image reading unit 12b is an example of the first reader according to the present invention, and the back side reading unit 14c is an example of the second reader according to the present invention. Further, the reading target area for the front side 300 is an example of the first reading area according to the present invention, and the reading target area for the back side 400 is an example of the second reading area according to the present invention. Furthermore, the front side read image 310 is an example of the first read image according to the present invention, and the back side read image 410 is an example of the second read image according to the present invention. Further, the front side document image 320 is an example of the first image according to the present invention, and the back side document image 420 is an example of the second image according to the present invention. In addition, the front side image shaping processing is an example of the first shaping processing according to the present invention, and the image processor 24 which is responsible for the front side image shaping processing is an example of the first shaper according to the present invention. Additionally, the back side image shaping processing is an example of the second shaping processing according to the present invention, and the image processor 24 which is responsible for the back side image shaping processing is an example of the second shaper according to the present invention.

Moreover, the image processor 24 which is responsible for converting the image resolutions of the front side shaped image 340 and the back side shaped image 440 to the set resolution in step S33 of the ADF document crop task is an example of the first converter according to the present invention. Further, the image processor 24 which is responsible for converting the image resolutions of the front side shaped image 340 and the back side shaped image 440 to a predetermined resolution in step S23 of the ADF document crop task is an example of the second converter according to the present invention. Furthermore, the image processor 24 which is responsible for the data origination processing in the electronic business card conversion processing in step S27 of the ADF document cropping task is an example of the data originator according to the present invention.

In addition, the electronic business card conversion processing in step S27 of the ADF document crop task is executed on the premise that the electronic business card conversion function is enabled. However, whether to enable the electronic business card conversion function is set by the setting screen 500 as described above. Further, the setting content by the setting screen 500 is stored as the setting data 656 as described above, and strictly speaking, is stored as the setting data 656 by the CPU 26a. Such CPU 26a is an example of the data origination controller according to the present invention.

Furthermore, the aforementioned document size detection function is implemented by the CPU 26a, the guide width detector 14f, and the document length detector 14k. The CPU 26a, the guide width detector 14f, and the document length detector 14k, that implement the document size detection function are examples of the document size detector according to the present invention. The size of the document 100 may be detected (derived) on the basis of only the guide width detected by the guide width detector 14f.

OTHER APPLICATION EXAMPLES

The present example is a specific example of the present invention and does not limit a technical scope of the present invention. In other words, the present invention can be applied to aspects other than the present example.

For example, the processing handled by the image processor 24 such as the front side image shaping processing and the back side image shaping processing may be handled by the CPU 26a instead of the image processor 24.

In addition, the image data output when the document 100 is a business card is output with a reduced predetermined image resolution of 300 dpi, but the resolution is not limited to this. In other words, the image data may be output while keeping the high image resolution of 600 dpi. However, it is desirable to reduce the image resolution of the image data used for the data origination processing in the electronic business card conversion processing before using the image data for the data origination processing.

Further, in the present example, the ADF document crop function when the multifunction peripheral 10 is used as an image scanner has been described. However, the present invention can also be applied to the ADF crop function when the multifunction peripheral 10 is used as a copier or fax machine. However, the electronic business card conversion function is applied only to the ADF document crop function when the multifunction peripheral 10 is used as an image scanner.

In short, the present invention is applicable to a document reading device including a function to read images on both sides of the document 100 in the skimming through method, and is further applicable to an image output apparatus equipped with the document reading device, such as an image scanner, a copier, and a fax machine.

Moreover, the present invention is provided not only in the form of a device or an apparatus, that is to say, a document reading device or an image output apparatus, but also in the form of a program, namely a control program for a document reading device, or the form of a method, namely a control method for a document reading device.

The present invention can also be provided in the form of a computer readable recording medium, in which the control program for the document reading device is recorded. The recording medium referred to here is, for example, a semiconductor medium such as a SD memory card and a USB memory, or disk medium such as a CD and a DVD. Not only these portable storage media, but also device embedded (built-in) storage media such as a ROM, a hard disk drive, and the like are applicable as the recording medium referred to herein.

What is claimed is:

1. A document reading device comprising:
a conveyer that conveys a sheet-like document along a conveyance path;
a first reader that reads, at a first reading position in the conveyance path, an image on one side of the document passing through the first reading position, over a first reading area larger than a size of the document;
a second reader that reads, at a second reading position in the conveyance path, an image on another side of the document passing through the second reading position, over a second reading area conjugate to the first reading area;
a first shaper that performs first shaping processing in which a first image corresponding to the image on the one side is cut out from a first read image read by the first reader, and when the first image is tilted to, or more than, a predetermined degree, a tilt of the first image is corrected; and
a second shaper that performs, on a basis of shaping information relating to the first shaping processing, second shaping processing in which a second image corresponding to the image on the other side is cut out from a second read image read by the second reader, and when the second image is tilted to, or more than, the predetermined degree, a tilt of the second image is corrected, wherein
the conveyor conveys the document at a set speed set as a conveyance speed of the document when the size of the document is, or larger than, a predetermined size, and conveys the document at a lowest settable speed as the conveyance speed when the size of the document is smaller than the predetermined size.

2. The document reading device according to claim 1, wherein a reading resolution of each of the first reader and the second reader is set in accordance with the conveyance speed.

3. The document reading device according to claim 1, further comprising a first converter that converts an image resolution of each of the first image and the second image to an image resolution corresponding to the set speed when the document is conveyed at the lowest settable speed different from the set speed.

4. The document reading device according to claim 1, wherein the predetermined size is optionally changeable.

5. The document reading device according to claim 1, further comprising a document size detector that detects the size of the document before the document is conveyed by the conveyer.

6. The document reading device according to claim 1, further comprising a data originator that performs data origination processing in which a character image contained in at least one of the first image and the second image is converted into character data when the document is a business card.

7. The document reading device according to claim 6, further comprising a second converter that converts, when an image resolution of a processing target image, among the first image and the second image, to be processed in the data origination processing is higher than a predetermined resolution, the image resolution of the processing target image to the predetermined resolution and subjects the processing target image to the data origination processing.

8. The document reading device according to claim 6, wherein whether the document is the business card is determined on a basis of the size of the document.

9. The document reading device according to claim 6, wherein whether the document is the business card is determined on a basis of a size of at least one of the first image and the second image.

10. The document reading device according to claim 8, wherein a determination criterion as to whether the document is the business card is optionally changeable.

11. The document reading device according to claim 6, further comprising a data origination controller that enables or disables the data originator in accordance with a user operation.

12. An image output apparatus comprising:
the document reading device according to claim 1; and
an image outputter that outputs the first image after the first shaping processing by the first shaper and outputs the second image after the second shaping processing by the second shaper.

13. A non-transitory computer-readable recording medium storing one or more instructions for a document reading device including a conveyer that conveys a sheet-like document along a conveyance path, a first reader that reads, at a first reading position in the conveyance path, an image on one side of the document passing through the first reading position, and a second reader that reads, at a second reading position in the conveyance path, an image on another side of the document passing through the second reading position, the control programone or more instructions, when executed by at least one processor, causing the at least one processor of the document reading device to execute:
- a first reading procedure for the first reader to read the image on the one side of the document over a first reading area larger than a size of the document;
- a second reading procedure for the second reader to read the image on the other side of the document over a second reading area conjugate to the first reading area;
- a first shaping procedure of performing first shaping processing in which a first image corresponding to the image on the one side is cut out from a first read image read by the first reading procedure, and when the first image is tilted to, or more than, a predetermined degree, a tilt of the first image is corrected;
- a second shaping procedure of performing, on a basis of shaping information relating to the first shaping processing, second shaping processing in which a second image corresponding to the image on the other side is cut out from a second read image read by the second reading procedure, and when the second image is tilted to, or more than, the predetermined degree, a tilt of the second image is corrected; and
- a conveying procedure of conveying the document at a set speed set as a conveyance speed of the document when the size of the document is, or larger than, a predetermined size, and conveying the document at a lowest settable speed as the conveyance speed when the size of the document is smaller than the predetermined size.

14. A control method for a document reading device including a conveyer that conveys a sheet-like document along a conveyance path, a first reader that reads, at a first reading position in the conveyance path, an image on one side of the document passing through the first reading position, and a second reader that reads, at a second reading position in the conveyance path, an image of another side of the document passing through the second reading position, the control method comprising:
- reading, by the first reader, the image on the one side of the document over a first reading area larger than a size of the document;
- reading, by the second reader, the image on the other side of the document over a second reading area conjugate to the first reading area;
- performing first shaping processing in which a first image corresponding to the image on the one side is cut out from a first read image read by the first reader, and when the first image is tilted to, or more than, a predetermined degree, a tilt of the first image is corrected;
- performing, on a basis of shaping information relating to the first shaping processing, second shaping processing in which a second image corresponding to the image on the other side is cut out from a second read image read by the second reader, and when the second image is tilted to, or more than, the predetermined degree, a tilt of the second image is corrected; and
- conveying the document at a set speed set as a conveyance speed of the document when the size of the document is, or larger than, a predetermined size, and conveying the document at a lowest settable speed as the conveyance speed when the size of the document is smaller than the predetermined size.

* * * * *